United States Patent [19]

Shimizu et al.

[11] Patent Number: 5,436,398
[45] Date of Patent: Jul. 25, 1995

[54] POLYMETALOSILAZANE, PROCESS OF PRODUCING SAME, SILICON NITRIDE BASED CERAMIC, AND PROCESS OF PREPARING SAME

[75] Inventors: Yasuo Shimizu; Hirohiko Nakahara; Tomoko Aoki; Osamu Funayama; Takeshi Isoda, all of Saitama, Japan

[73] Assignee: Tonen Corporation, Japan

[21] Appl. No.: 223,866

[22] Filed: Apr. 6, 1994

[30] Foreign Application Priority Data

Apr. 8, 1993 [JP] Japan .................................. 5-106194

[51] Int. Cl.⁶ ............................................. C08L 83/04
[52] U.S. Cl. ..................... 525/475; 525/474; 528/8; 528/9; 528/30; 528/33; 528/34; 528/38
[58] Field of Search .................... 525/474, 475; 528/8, 528/9, 30, 33, 34, 38

[56] References Cited

U.S. PATENT DOCUMENTS 4,730,026  3/1988  Bolt et al. .............................. 501/97
4,886,860 12/1989  Arai et al. ............................ 525/475

Primary Examiner—Melvyn I. Marquis
Attorney, Agent, or Firm—Lorusso & Loud

[57] ABSTRACT

A preceramic polymetalosilazane substantially free of Si-O groups is produced by reacting a polysilazane with a metal alkoxide in the presence of an alkylsilazane or alkylsilane. The preceramic polymer gives a high strength and heat resistant ceramic body which remains amorphous when calcined at 1,600° C. for 10 hours in the atmosphere of nitrogen.

6 Claims, 12 Drawing Sheets

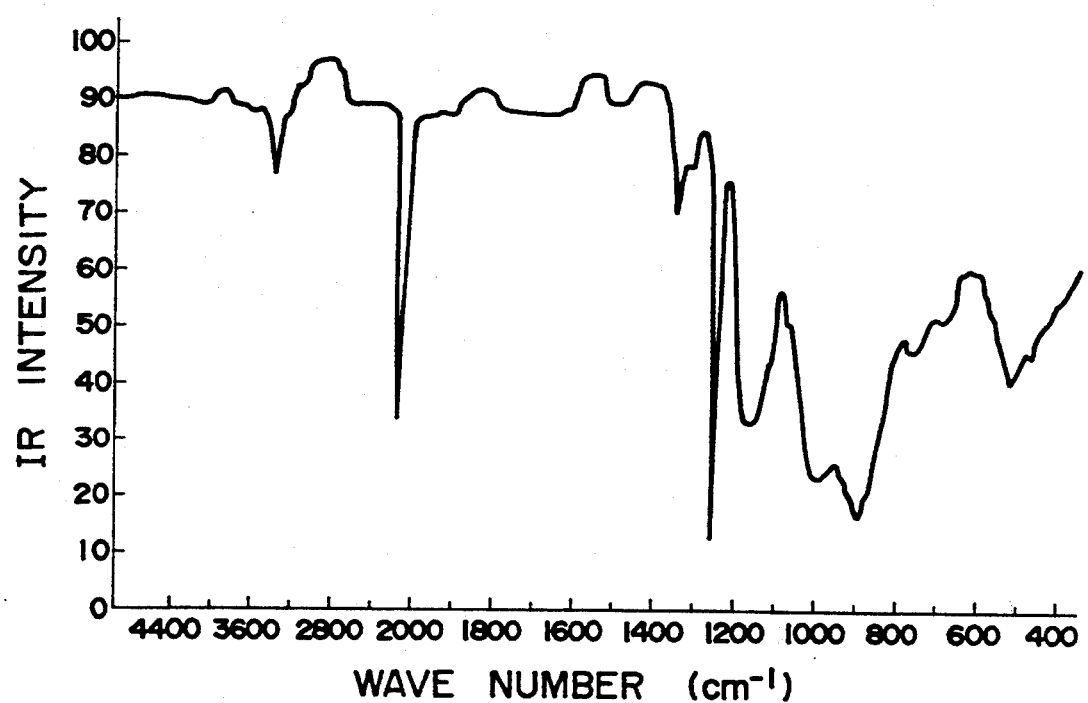
F I G. 11
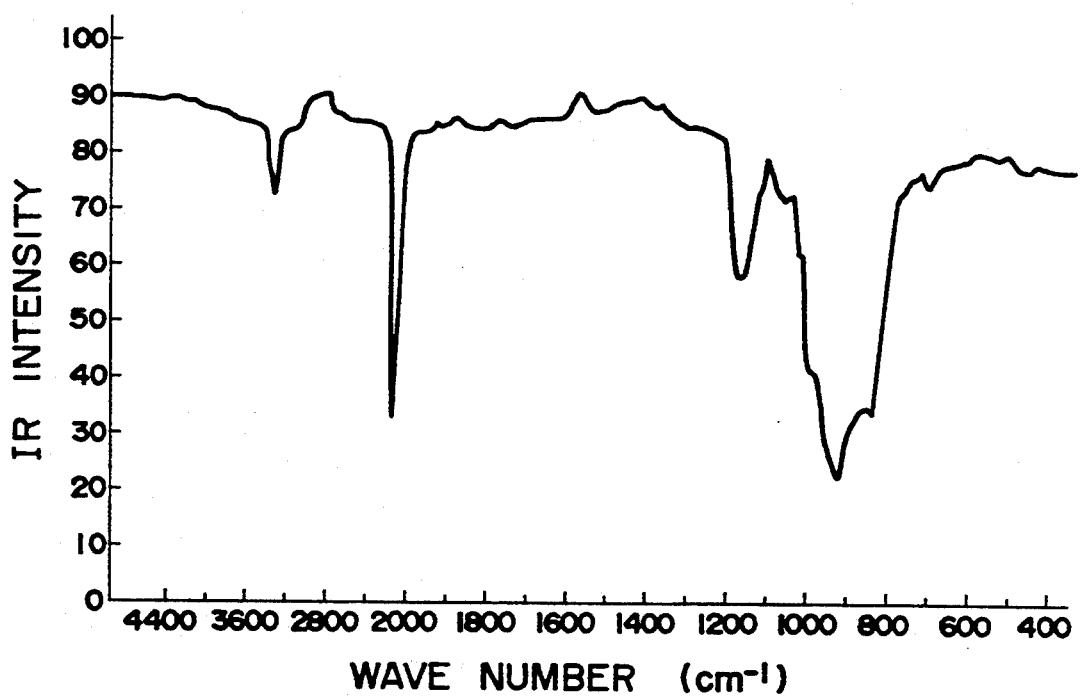
F I G. 12

CHEMICAL SHIFT δ (ppm)

WAVE NUMBER (cm$^{-1}$)

POLYMETALOSILAZANE, PROCESS OF PRODUCING SAME, SILICON NITRIDE BASED CERAMIC, AND PROCESS OF PREPARING SAME

BACKGROUND OF THE INVENTION

1. Field of the Invention

This invention relates to a low oxygen content polymetalosilazane and to a process of producing same.: The present invention also pertains to a metal-containing silicon nitride ceramic and to a process of preparing same.

2. The Prior Art

Ceramic fibers have been attracting much attention for their favorable properties such as high mechanical strengths and resistance to heat and chemicals and will find use for a variety of applications as reinforcing materials for various composite articles such as engine parts, fan blades and aircraft structures.

U.S. Pat. No. 4,886,860 discloses a process of preparing a polymetalosilazane wherein a polysilazane having a number molecular weight of 100-50,000 and having a skeleton consisting essentially of units of the following general formula:

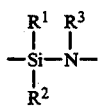

wherein $R^1$, $R^2$ and $R^3$ is independently selected from hydrogen, an alkyl group, an alkenyl group, a cycloalkyl group, an aryl group, a group other than the above-mentioned groups in which the atom bonded directly to the silicon atom is a carbon atom, an alkylsilyl group, an alkylamino group and an alkoxy group is reacted with a metal alkoxide of the formula:

wherein M is a metal selected from those of groups IIA and III through V of the Periodic Table, $R_4$ is hydrogen, an alkyl having 1-20 carbon atoms or an aryl and n is the valence of the metal M with the proviso that at least one of the $R_4$ groups is the alkyl group or aryl group. The polymetalosilazane obtained by the above method unavoidably contains oxygen derived from the metal alkoxide. The oxygen introduced into the polymer is converted into SiO gas during the calcining stage so that small pores or gaps are apt to be formed in the ceramic product, which adversely affects the mechanical strengths and heat resistance of the ceramic.

U.S. Pat. No. 4,730,026 (equivalent of EP-A-262,914) discloses a polymetalosilazane which is obtained by reacting a silazane with an oxygen-free metal compound such as an alkyl metal or a metal halide and in which the silazane is cross-linked with, for example, —MR— linkages. a ceramic body obtained therefrom. The polymetalosilazane obtained using the oxygen free metal compound gives a ceramic having a low oxygen content. However, the above method is not practical and requires much costs because the metal compound is dangerous.

SUMMARY OF THE INVENTION

In accordance with one aspect of the present invention, there is provided a silicon nitride ceramic containing Si, N, at least one metal M which is selected from those of the groups IIa, IIIa, IIIb, IVa IVb, Va and Vb of the Periodic Table, O and C in amounts providing the following atomic ratios:

N/Si : 0.05 to 3,
M/Si : 0.05 to 3,
O/M : 1 or less, and
C/Si : 1 or less said ceramic being amorphous when calcined at 1,600° C. for 10 hours in the atmosphere of an inert gas and having a three-point bending strength of at least 2 MPa.

In another aspect, the present invention provides a silicon nitride ceramic fiber containing Si, N, at least one metal M which is selected from those of the groups IIa, IIIa, IIIb, IVa IVb, Va and Vb of the Periodic Table, O and C in amounts providing the following atomic ratios:

N/Si : 0.05 to 3,
M/Si : 0.05 to 3,
O/M : 1 or less, and
C/Si : 1 or less said ceramic fiber being amorphous when calcined at 1,500° C. for 1 hour in the atmosphere of an inert gas and having a tensile strength of at least 100 kg/mm².

In a further aspect, the present invention provides a process of producing a silicon nitride ceramic, comprising the steps of:

reacting a polysilazane with a metal alkoxide of the formula:

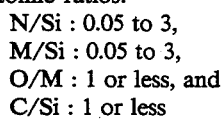

wherein M is as defined above, $R_3$ is hydrogen, an alkyl group having 1-20 carbon atoms or an aryl group and n is the valence of the metal M with the proviso that at least one of the n number of the $R_3$ is the alkyl group or aryl group, in the presence of a silicon compound represented by the following general formula:

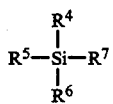

wherein $R^4$, $R^5$, $R^6$ and $R^7$, independently from each other, represent hydrogen, a hydrocarbyl group, a substituted hydrocarbyl group, an alkylsilyl group, an alkylamino group, an alkoxy group, —$SR^8$ where $R^8$ represents hydrogen or an alkyl group or —$SR^9R^{10}R^{11}$ where $R^9$, $R^{10}$ and $R^{11}$, independently from each other, represent hydrogen or an alkyl group, to obtain a polymetalosilazane; and calcining said polymetalosilazane at a temperature of 400°-1,800° C.

The present invention also provides a process of producing a polymetalosilazane, comprising reacting a polysilazane with a metal alkoxide of the formula:

wherein M is as defined above, $R_3$ is hydrogen, an alkyl group having 1-20 carbon atoms or an aryl group and n is the valence of the metal M with the proviso that at least one of the n number of the $R_3$ is the alkyl group or aryl group, in the presence of a silicon compound represented by the following general formula:

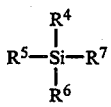

wherein $R^4$, $R^5$, $R^6$ and $R^7$, independently from each other, represent hydrogen, a hydrocarbyl group, a substituted hydrocarbyl group, an alkylsilyl group, an alkylamino group, an alkoxy group, $-SR^8$ where $R^8$ represents hydrogen or an alkyl group or $-SR^9R^{10}R^{11}$ where $R^9$, $R^{10}$ and $R^{11}$, independently from each other, represent hydrogen or an alkyl group.

In a further aspect, the present invention provides a polymetalosilazane obtained by the above method.

BRIEF DESCRIPTION OF THE DRAWINGS

In the drawings:

FIG. 11 is the infrared spectrum of the polymer produced in Example 11 below, in accordance with the present invention;

FIG. 12 is the infrared spectrum of the polymer produced in Reference Example 1 in accordance with the present invention;

DESCRIPTION OF THE PREFERRED EMBODIMENTS

Figure 1:
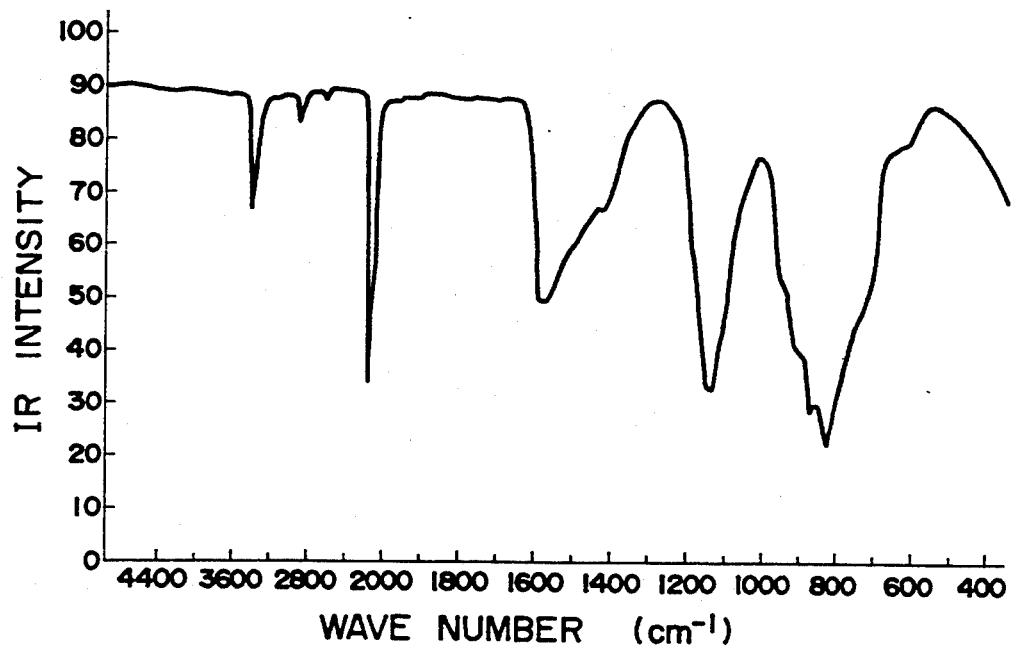
FIG. 1 shows the infrared spectrum for the polymer produced in Example 1 below in accordance with the present invention.

The present invention will now be described in detail below.

The ceramic according to the present invention contains Si, N and at least one metal M. It is important that the amount of Si, N and M should be such as to provide the following atomic ratios:

N/Si : 0.05 to 3,
M/Si : 0.05 to 3,
O/M : 1 or less, and
C/Si : 1 or less

A proportion of the metal M below the above specified range causes reduction of the mechanical strengths and heat resistance of the ceramics. Too large an amount of the metal M in excess of the above specified range is disadvantage because the substance is no longer a ceramic. Preferred atomic ratios are as follows:

N/Si : 0.05 to 2
M/Si : 0.05 to 1
O/M : 0.5 or less
C/Si : 0.2 or less

The metal M is preferably at least one element selected from those of the groups IIa, IIIa, IIIb, IVa IVb, Va and Vb of the Periodic Table. Illustrative of suitable metals are Be, Mg, Ca, Sr, Ba, Sc, Y, lanthanoid elements, actinoid elements, B, Al, Ga, In, Tl, Ti, Zr, Hf, Ge, Sn, Pb, V, Nb, Ta, As, Sb, and Bi. Above all, Y, B, Al, Ti and Zr are especially preferred.

The ceramic according to the present invention is characterized by high mechanical strengths and high heat resistance. For example, when the ceramic is in the form of a plate, the three-point bending strength thereof is at least 2 MPa. In the form of a fiber, the tensile strength is at least 100 kgf/mm². The shaped ceramic bodies retains their amorphous state and high mechanical strength even after being subjected to a high temperature. For example, a ceramic plate according to the present invention remains amorphous even when heated at 1,600° C. for 10 hours in the atmosphere of an inert gas and a ceramic fiber of the present invention remains amorphous when heated at 1,500° C. for 1 hour.

These characteristics of the ceramic bodies according to the present invention are considered to be attributed to the presence of the metal and to the low oxygen and carbon contents. The presence of the metal in the ceramic serves to prevent the formation of crystals so that the ceramic remains amorphous even when subjected to such a high temperature as to be favorable for the formation of crystals. The formation of crystals in the amorphous ceramic bodies adversely affect the mechanical strengths and heat resistance thereof. The fact that the ceramic has low oxygen and carbon contents means that the preceramic polymer from which the ceramic has been prepared, too, has low oxygen and carbon contents. Since the oxygen and carbon contained in the preceramic polymer are converted into SiO, CO and $CO_2$ gases when heated at a temperature of 1,200° C., fine pores or gaps are apt to be formed in the ceramic body obtained by calcination thereof.

The process for the production of the ceramic according to the present invention will now be described below.

PREPARATION OF PRECERAMIC POLYMETALOSILAZANE

The polymetalosilazane is produced by reacting a polysilazane with a metal alkoxide of the formula (II):

$$M(OR^3)_n \qquad (II)$$

wherein M is as defined above, $R_3$ is hydrogen, an alkyl group having 1-20 carbon atoms or an aryl group and n is the valence of the metal M with the proviso that at least one of the n number of the $R_3$ is the alkyl group or aryl group, in the presence of a silicon compound represented by the following general formula (III):

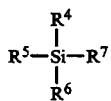
(III)

wherein $R^4$, $R^5$, $R^6$ and $R^7$, independently from each other, represent hydrogen, a hydrocarbyl group, a substituted hydrocarbyl group, an alkylsilyl group, an alkylamino group, an alkoxy group, $-SR^8$ where $R^8$ represents hydrogen or an alkyl group or $-SR^9R^{10}R^{11}$ where $R^9$, $R^{10}$ and $R^{11}$, independently from each other, represent hydrogen or an alkyl group.

The polysilazane preferably has a number average molecular weight of 100-500,000 and a main skeletal structure containing the following recurring unit (I):

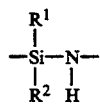
(I)

wherein $R^1$ and $R^2$, independently from each other, represent hydrogen, a hydrocarbyl group, a substituted hydrocarbyl group, an alkylsilyl group, an alkylamino group or an alkoxy group, Preferably the hydrocarbyl group of $R^1$, $R^2$, $R^4$, $R^5$, $R^6$ and $R^7$ is an alkyl, alkenyl, an aryl, a cycloalkyl or aralkyl.

Examples of suitable substituents $R^1$ and $R^2$ of the polysilazane of the formula (I) include hydrogen, an alkyl group having 1-5 carbon atoms, an alkenyl group having 2-6 carbon atoms, a cycloalkyl group having 5-7 carbon atoms, an aryl group, an alkylsilyl group having 1-4 carbon atoms, an alkyl amino group having 1-5 carbon atoms and an alkoxy group having 1-5 carbon atoms. Above all, hydrogen, a methyl group, an ethyl group, a vinyl group, a methylamino group, an ethylamino group, a methoxy group and an ethoxy group.

Examples of suitable substituent $R^3$ of the metal alkoxide of the formula (II) include hydrogen, a methyl group, a n-propyl group, an i-propyl group, a n-butyl group, an i-butyl group, a t-butyl group, a phenyl group, a benzyl 4 group and a tolyl group. The amount of the metal alkoxide relative to the polysilazane is preferably such as to provide an atomic ratio M/Si of 0.001-60, more preferably 0.01-5, most preferably 0.05-2.5. Too small an amount of the metal alkoxide below M/Si of 0.001 is insufficient to obtain highly cross-linked polymetalosilazane, while too large an amount of the metal alkoxide in excess of M/Si of 60 gives no additional merit and is economically disadvantageous.

Examples of suitable silicon compound of the formula (III) include alkyl silazanes such as trimethylsilylamine $((CH_3)_3SiNH_2)$ trimethyldimethylsilylamine $((CH_3)_3SiN(CH_3)_2)$ and dimethylsilylamine $((CH_3)_2SiHNH_2)$; alkyldisilazanes such as hexamethyldisilazane $((CH_3)_3SiNHSi(CH_3)_3)$, heptamethyldisilazane $((CH_3)_3SiNCH_3Si(CH_3)_3)$ and tetramethyldisilazane $((CH_3)_2SiHNHSiH(CH_3)_2)$; alkylhalosilanes such as trimethylchlorosilane $((CH_3)_3SiCl)$, dichlorosilane $(SiH_2Cl_2)$, dimethyldichlorosilane $((CH_3)_2SiCl_2)$, monomethylchlorosilane $((CH_3)SiHCl_2)$, trimethylbromosilane $((CH_3)_3SiBr)$ and trimethyliodosilane $((CH_3)_3SiI)$; alkylsilanes; and alkyldisilanes such as hexamethyldisilane $((CH_3)_3SiSi(CH_3)_3)$ and tetramethyldisilane $((CH_3)_2SiHSiH(CH_3)_2)$. The alkyl groups of the silicon compounds are suitably lower alkyl groups such as a methyl group. The silicon compound (III) is preferably used in an amount of at least 1 mole per mole of the polysilazane (I), more preferably in an amount of at least n (which equals the valence of the metal M of the metal alkoxide) moles per mole of the metal alkoxide (II).

The reaction for the formation of the polymetalosilazane is preferably performed using an inert solvent such as an aromatic hydrocarbon, an aliphatic hydrocarbon, an alicyclic hydrocarbon, a halogenated hydrocarbon, an aliphatic ether or an alicyclic ether. Illustrative of suitable solvents are benzene, toluene, xylene, methylene chloride, chloroform, n-hexane, ethyl ether and tetrahydrofuran. The reaction is preferably performed at a temperature of not higher than 400° C. for reasons of preventing the formation of a gel by the decomposition of the polymetalosilazane. For the purpose of obtaining a polymetalosilazane with a high number average molecular weight, it is advisable to perform the reaction below the boiling point of the solvent and then complete the reaction at a temperature higher than the boiling point of the solvent while removing the solvent by evaporation.

The reaction is generally performed at ambient pressure for 30 minutes to 24 hours. A reaction time longer than 24 hours can increase the molecular weight of the polymetalosilazane. For preventing the oxidation and/or hydrolysis of the starting materials, it is preferred that the reaction be performed in the atmosphere of an inert gas such as nitrogen or argon. The unreacted metal alkoxide can be separated from the polymetalosilazane product by vacuum distillation or liquid chromatography.

By reaction of the polysilazane with the metal alkoxide, an alcohol is produced together with the polymetalosilazane as follows:

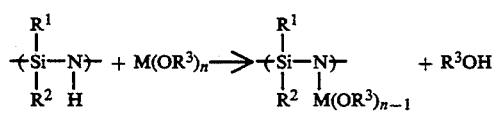

The thus produced alcohol R3OH readily reacts with the raw material polysilazane or the polymetalosilazane to cleave the skeletal chain thereof with the simultaneous introduction of alkoxide groups —OR³ into the cleaved cites, for example, as follows:

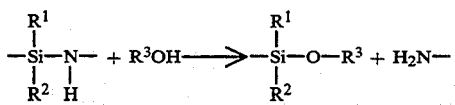

When the silicon compound of the formula (III) is present, however, the alcohol is reacted with the silicon compound rather than with the polymetalosilazane or polysilazane:

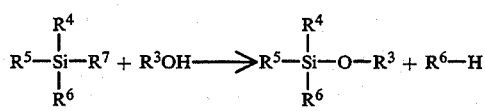

Thus, the presence of the silicon compound of the formula (III) can effectively prevent the cleavage of the polysilazane and polymetalosilazane polymer chains and the introduction of the oxygen (as Si—O—R³) into the polymetalosilazane.

The polymetalosilazane thus obtained by the process of the present invention is substantially free of Si-O bonds. Preferably, the polymetalosilazane has a number average molecular weight of 200–500,000, more preferably 400–300,000 and an M/Si atomic ratio of 0.001–3, more preferably 0.01–2.0. Since the polymetalosilazane is generally soluble in a solvent, it is easy to obtain a shaped ceramic body such as a plate, block, cylinder, pipe or fiber. Further, the polymetalosilazane does not need an infusiblization treatment such as oxidation, so that it is possible to obtain a ceramic product having a low oxygen content.

PREPARATION OF SHAPED CERAMIC BODIES

The preceramic polymetalosilazane is shaped into a desired form and calcined to obtain a shaped ceramic body. If desired, an additive such as a hardening agent or ceramic powder may be mixed with the preceramic polymer. Examples of suitable hardening agent include organic amines such as alkylamines and alkylene diamines; acid anhydrides such as oxalic anhydride and malonic anhydride; isocyanates such as alkylisocyanates and dimethylsilyldiisocyanate; thiols such as butane dithiol and benzene dithiol; imides such as malonimide and succinimide; metal alkoxides such as alkoxides of metals of groups IIa and III-V of the Periodic Table; and metal halides such as those of iron, cobalt, nickel, copper, silver, gold, mercury, zinc, ruthenium, paradium, indium, titanium, hafnium, zirconium, aluminum, boron and phosphorus. Examples of ceramic powder which is used for preventing cracks or increasing mechanical strengths include nitrides, carbides and oxides of metals.

For example, the preceramic polymer is dissolved in a suitable solvent such as a hydrocarbon, a halogenated hydrocarbon or an ether and the solution is filled in a mold cavity. The solution is then heated under atmospheric pressure or under a reduced pressure to remove the solvent, thereby to form a shaped body. Alternatively, the preceramic polymer in the form a solid is directly filled in a mold cavity and heated from room temperature to a temperature of 400° C. at maximum at a pressure of up to 10 atm. In the case of a liquid preceramic polymer, the polymer is directly filled in a mold cavity and heated from room temperature to a temperature of 400° C. at maximum under a reduced pressure or at a pressure of up to 10 atm. The molding of the preceramic polymer may be performed in the atmosphere of an inert gas such as nitrogen or argon, a reducing gas such as ammonia, hydrogen, methylamine or hydrazine, an oxidizing gas such as air, oxygen or ozone, or a mixed gas thereof. Any known suitable mold may be used. Preferably, a mold releasing agent such as a silicone-based agent or a grease may be applied to the inside surface of the mold.

The preceramic polymer according to the present invention may be shaped into fibers by spinning through a nozzle. Thus, the polymer is dissolved in a suitable solvent and the solution is concentrated in vacuo until a suitable viscosity is reached. The amount of the polymetalosilazane in the solution is not critical as long as the solution can exhibit a suitable spinnability. Generally, however, a concentration of 50–98% by weight gives good results. Optimum concentration varies with the number average molecular weight, molecular weight distribution and molecular structure of the polymetalosilazane.

Before spinning, the spinning solution is desirably subjected to defoaming, filtration and other treatments for the removal of gels and foreign matters which will adversely affect the spinnability. The spinning is advantageously effected by a dry spinning method. Alternatively, centrifugal or blow spinning methods can be adopted. In dry spinning, the solution is discharged through a spinning nozzle to a cylinder and the spun fibers are continuously wound around a roll. The nozzle diameter, spinning speed and winding speed vary with the property of the spinning solution and with the intended diameter of the spun fibers. A nozzle diameter of 0.035–0.5 mm, preferably 0.05–0.3 mm and a winding speed of 30–5000 m/minute, preferably 60–2500 m/minute are generally used. The inside of the cylinder into which the fibers are discharged from the spinning nozzle can be maintained in any desired atmosphere such as air. It is, however, preferable to maintain the inside of the cylinder in a dried air atmosphere, an ammoniacal atmosphere or an inert gas atmosphere for the purpose of controlling the infusiblization and solidification of the spun fibers. The spinning solution is generally maintained at a temperature of 10°–300° C. and the temperature within the cylinder is generally held at a temperature of 20°–300° C.

The polymetalosilazane may also be shaped into a film by coating a solution thereof onto a surface of a metal or a ceramic and, then, drying the coating by evaporation of the solvent.

The thus obtained shaped body of the polymetalosilazane is then pyrolyzed or calcined at temperatures of 400°–1,800° C. to form a ceramic body. The pyrolysis is preferably carried out in the atmosphere of an inert gas such as described above, a reducing gas such as described above or a mixture thereof, or under vacuum. Preferably a heating rate of 20° C./minute or less, more preferably 5° C./minute or less, is used for the heating of the shaped body from 400° C. to 1,800° C. When the maximum temperature, for example, 1,800° C. is reached, the pyrolysis is further continued at that temperature for 48 hours or less. If desired, pyrolysis is performed under pressure using a hot press. Further, the ceramic body obtained by the pyrolysis may be impregnated with a solution of the polymetalosilazane and calcined again. It is advisable to maintain the pyrolysis temperature not higher than 1,800° C. for avoiding the formation of crystals.

The following examples will further illustrate the present invention.

The elementary analysis was performed with ICP (inductive coupled plasma emission spectroscope) for the determination of Si and M, a nitrogen-oxygen simultaneous analyzer (EM6A-2800 manufactured by Horiba Inc.) for N and O and a carbon-hydrogen-nitrogen simultaneous analyzer (CHN Rapid Analyzer manufactured by Helaus Inc.).

The crystalophase of ceramics was determined by the X-ray diffraction analysis. Before analysis, the sample was ground into particles having a particle size of in the range of 10-100 μm and the ground powder was heated at 1,600° C. for 10 hours in the atmosphere of nitrogen.

The three-point bending strength was measured with a universal tester with a spun of 10 mm and a load applying speed of 1 mm/minute. The sample had a sectional area of 4-7 mm$^2$.

The tensile strength was measured with an autograph (AG-2000C manufactured by Shimadzu Seisakusho Ltd.)

REFERENCE EXAMPLE 1

Preparation of Perhydropolysilazane

To a four-necked, 1 liter flask equipped with a gas feed conduit, a mechanical stirrer and a Dewar condenser, an oxygen-free, dry nitrogen gas was fed to replace the air within the flask therewith. After charging 490 ml of deaerated, dry pyridine, the flask was cooled in an ice bath. Then, 51.9 g of dichlorosilane was added into the flask to form a white, solid precipitate of an adduct (SiH$_2$Cl$_2$·2C$_5$H$_5$N). Subsequently, with stirring and cooling the reaction mixture in the ice bath, 51.0 g of ammonia, which had been refined by being passed successively through a sodium hydroxide-containing tube and an active carbon-containing tube, was bubbled through the reaction mixture within the flask. The reaction mixture was then heated at 100° C. for the completion of the reaction.

Figure 13:
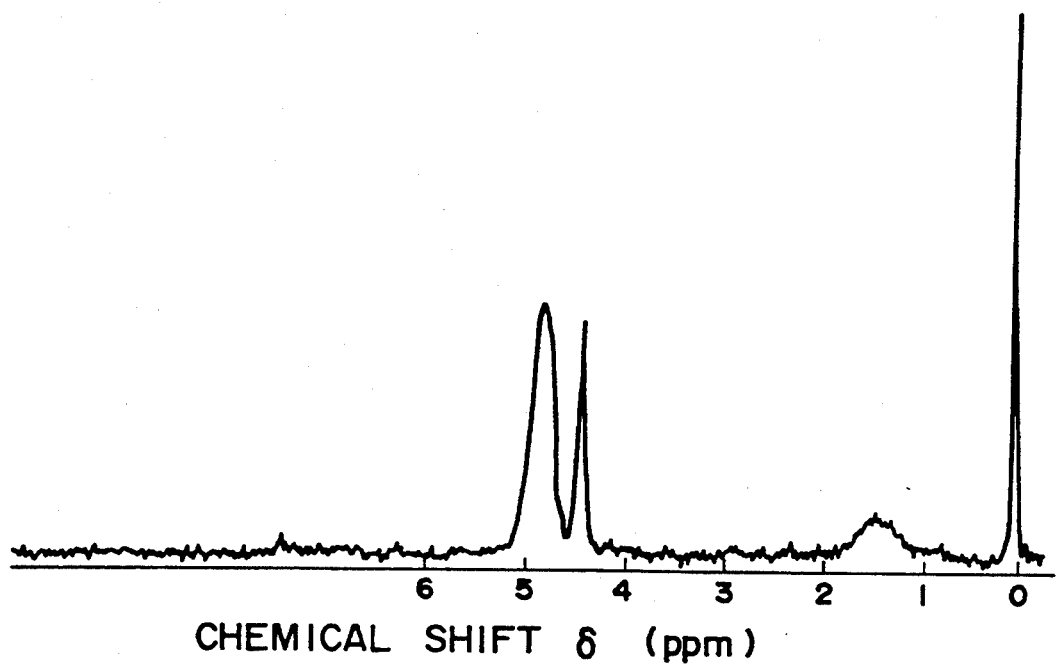
FIG. 13 is the $^1H$ NMR spectrum of the polymer produced in Reference Example 1 in accordance with the present invention.

Thereafter, the reaction mixture was centrifuged, and the supernatant was washed with dry pyridine, followed by filtration in a nitrogen atmosphere to give 850 ml of a filtrate containing perhydropolysilazane. When the solvent was removed from the liltrate (5 ml) by evaporation in vacuo, 0.102 g of resinous solid, perhydropolysilazane was obtained. The analysis by the cryoscopic method revealed that the perhydropolysilazane had a number-average molecular weight of 1,120. The infrared spectrum of this polymer (solvent: dry o-xylene; concentration of the perhydropolysilazane: 10.2 g/liter) is shown in FIG. 12. There are absorption peaks based on NH at wave numbers of 3,350 cm$^{-1}$ (apparent absorptivity coefficient $\epsilon$=0.557 1 g$^{-1}$cm$^{-1}$) and 1,175 cm$^{-1}$, a peak at 2,170 cm$^{-1}$ ($\epsilon$=3.14) based on SiH, a broad peak at 1,020-820 cm$^{-1}$ based on Si-N-Si. The $^1$HNMR (proton nuclear magnetic resonance) spectrum of (60 MHz; solvent: CDCl$_3$; reference substance: TMS) of this polymer indicated broad peaks at δ of 4.8, 4.4 (br, SiH) and 1.5 (br, NH), as shown in FIG. 13.

REFERENCE EXAMPLE 2

Production of Polymethyl(hydro)silazane:

To a four-necked, 500 ml liter flask equipped with a gas feed conduit, a mechanical stirrer and a Dewar condenser, an oxygen-free, dry nitrogen gas was fed to replace the air within the flask therewith. After charging 300 ml of dry dichloromethane and 24.3 g (0.221 mol) of methyldichlorosilane, the flask was cooled in an ice bath. Then, with stirring, 20.5 g (1.20 mol) of dry ammonia was bubbled, together with nitrogen, through the reaction mixture within the flask. After completion of the reaction, the reaction mixture was centrifuged, followed by filtration. When the solvent was removed from the filtrate by evaporation in vacuo, 8.79 g of colorless, transparent methyl(hydro)silazane was obtained. The cryoscopic analysis revealed that the polymethyl(hydro)- silazane had a number-average molecular weight of 310.

To a four-necked, 100 ml flask equipped with a gas feed conduit, a thermometer, a dropping funnel and a condenser, an argon gas was fed to replace the air within the flask therewith. Then, 12 ml of tetrahydrofuran and 0.189 g (4.71 mol) of potassium hydroxide were charged into the flask and stirred with a magnetic stirrer. The polymethyl(hydro)silazane (5.0 g) obtained above and 50 ml of dry 8 tetrahydrofuran were charged into the dropping funnel and 9 added dropwise to the mixture in the flask. The resulting mixture was reacted at room temperature for 1 hour. Thereafter, 1.60 g (11.3 mmol) of methyl iodide and 1 ml of dry tetrahydrofuran were charged into the dropping funnel and added dropwise into the mixture in the flask. The resulting mixture was reacted at room temperature for 3 hours. The solvent was then removed in vacuo from the reaction mixture and the residues were mixed with 40 ml of dry n-hexane. The mixture was centrifuged and filtered and the solvent was removed from the filtrate in vacuo to obtain 4.85 g of white powder of polymethyl(hydro)-silazane.

Figure 14:
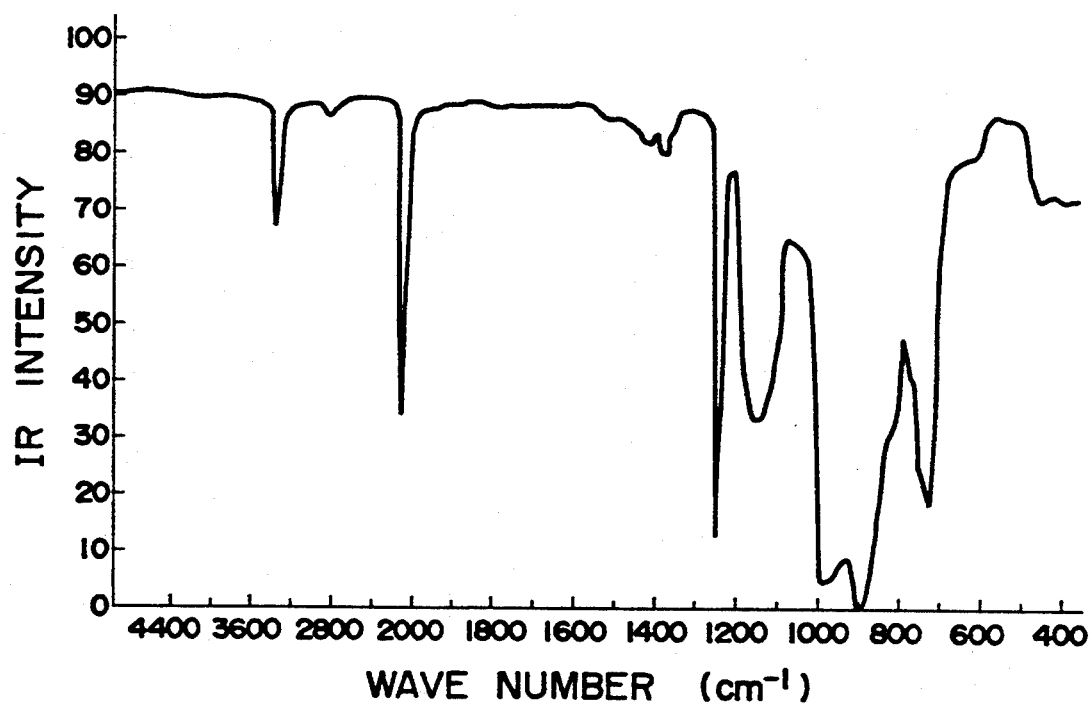
FIG. 14 is the infrared spectrum of the polymer produced in Reference Example 2 below, in accordance with the present invention.
Figure 15:
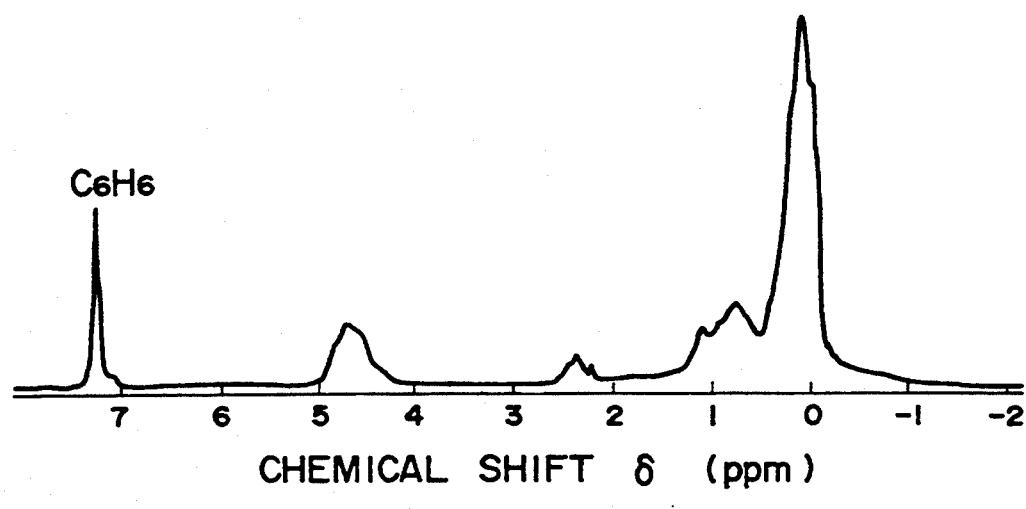
FIG. 15, is the $^1H$ NMR spectrum of the polymer produced in Reference Example 2 in accordance with the present invention.

The polymethyl(hydro)silazane thus obtained was found to have a number-average molecular weight of 1,060. The infrared spectrum of this polymer (solvent: dry o-xylene; concentration of the polymethyl(hydro)-silazane: 43.2 g/liter) is shown in FIG. 14. There are absorption peaks based on NH at wave numbers of 3,380 cm$^{-1}$ (apparent absorptivity coefficient $\epsilon$=0.249 1 g$^{-1}$cm$^{-1}$) and 1160 cm$^{-1}$, a peak at 2,120 cm$^{-1}$ ($\epsilon$=0.822) based on SiH, a peak at 1,255 cm$^{-1}$ based on Si-CH$_3$. The $^1$HNMR (proton nuclear magnetic resonance) spectrum of (60 MHz; solvent: CDCl$_3$; reference substance: TMS) of this polymer indicated peaks at δ4.7 (Si-H, 0.56H), δ2.4 (N-CH$_3$, 0.15H), δ0.7 (NH, 0.51H) and δ0.2 (Si-CH$_3$), as shown in FIG. 15. Accordingly, the polymer was found to have a composition of (CH$_3$SiHNH)$_{0.51}$(CH$_3$SiN)$_{0.44}$(CH$_3$SiHNCH$_3$)$_{0.05}$.

COMPARATIVE EXAMPLE 1

Production of Polyborosilazane

To a 200 ml four-necked flask equipped with a gas feed conduit, a dropping funnel, a thermometer and a magnetic stirrer, a dry nitrogen gas was fed for replacing the air therewith. Then, 110 g of a solution of the perhydropolysilazane obtained in Reference Example 1 in benzene (concentration of perhydropolysilazane: 4.57% by weight) was charged into the flask. A solution of 2.90 g (27.9 mmol) of trimethyl borate (B(OCH$_3$)$_3$) in 6.5 ml dry benzene was added into the solution in the flask using a syringe with stirring. The resulting mixture was reacted at 160° C., whereupon the colorless reaction mixture was turned light yellow. After completion of the reaction, the solvent was removed in vacuo to obtain light yellow solids with a yield of 90% by weight.

Figure 16:
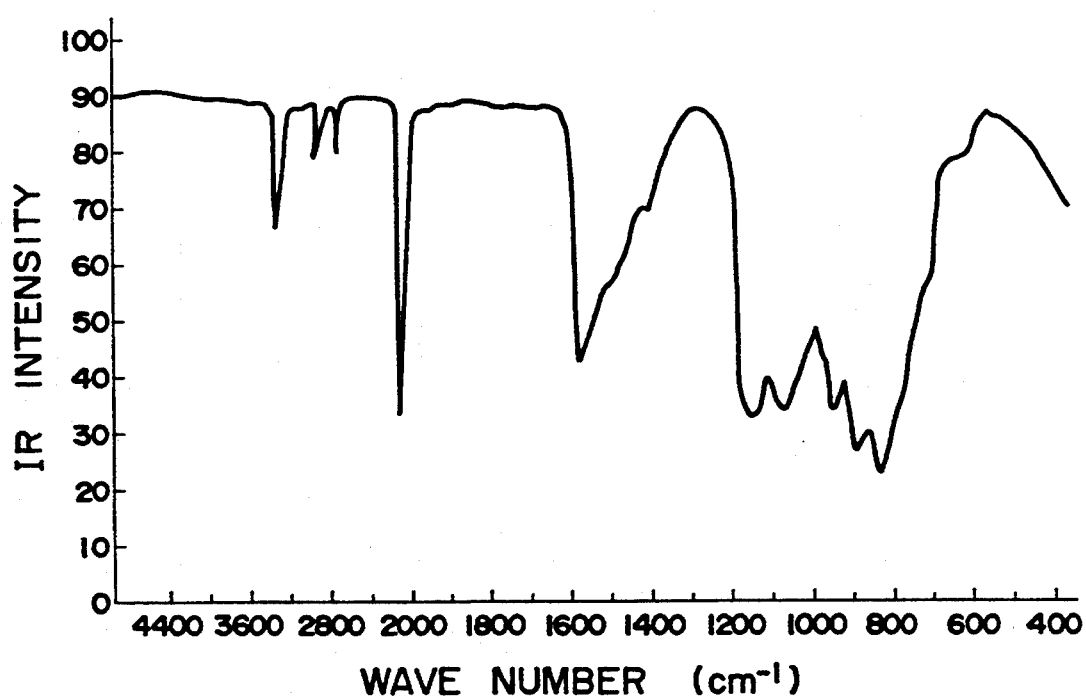
FIG. 16 is the infrared spectrum of the polymer produced in Comparative Example 1 below.

The cryoscopic method using dry benzene as a solvent revealed that the polyborosilazane had a number-average molecular weight of 1,550. The infrared spectrum of this polymer (solvent: dry benzene) is shown in FIG. 16. There are absorption peaks based on $CH_3$ and $OCH_3$ (at 2,960 and 2,850 cm$^{-1}$), a broad peak based on B-O and B-N (1,300–1,540 cm$^{-1}$) and a peak based on Si-O (1,100 cm$^{-1}$) in addition to a peak based on NH (3350 cm$^{-1}$) and a peak based on Si-H (2,170 cm$^{-1}$). The elementary analysis of the polymer gave the following results (in terms of % by weight):

Si: 43.9, N: 24.7, C: 9.8, O: 10.6, H: 6.8, B: 4.2

COMPARATIVE EXAMPLE 2

Production of Polyborosilazane

To a 200 ml four-necked flask equipped with a gas feed conduit, a dropping funnel, a thermometer and a magnetic stirrer, a dry nitrogen gas was fed for replacing the air therewith. Then, 2.93 g of the polymethyl(hydro)silazane obtained in Reference Example 2 and 80 ml of dry o-xylene were charged into the flask, into which 1.29 g (12.4 mmol) of trimethyl borate (B(OCH$_3$)$_3$) was added with stirring. The mixture was then reacted at 180°–200° C., whereupon the colorless reaction mixture was turned light yellow. After completion of the reaction, the solvent was removed in vacuo to obtain light yellow solids with a yield of 85% by weight.

Figure 17:
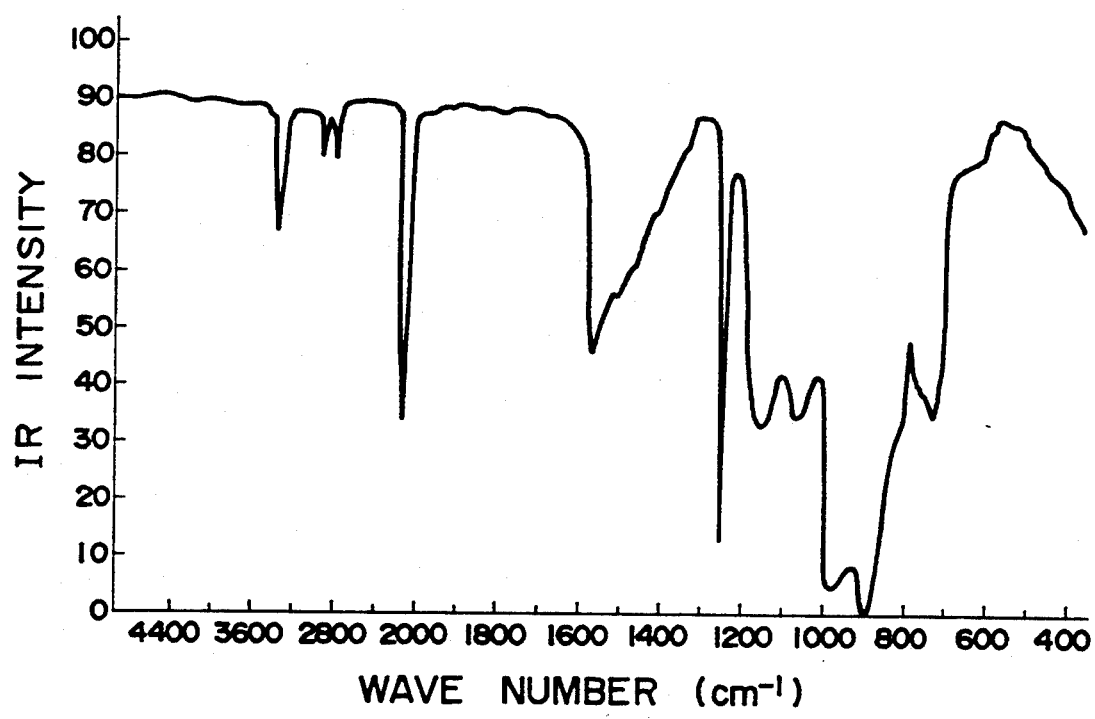
FIG. 17 is the infrared spectrum of the polymer produced in Comparative Example 2 below.

The cryoscopic method using dry benzene as a solvent revealed that the polyborosilazane had a number-average molecular weight of 1,350. The infrared spectrum of this polymer (solvent: dry benzene) is shown in FIG. 17. There are absorption peaks based on $CH_3$ and $OCH_3$ (at 2,960 and 2,850 cm$^{-1}$), a broad peak based on B-O and B-N (1,300–1,540 cm$^{-1}$) and a peak based on Si-O (1,100 cm$^{-1}$) in addition to a peak based on NH (3350 cm$^{-1}$) and a peak based on Si-H (2,170 cm$^{-1}$). The elementary analysis of the polymer gave the following results (in terms of % by weight):

Si: 34.5, N: 19.8, C: 25.5, O: 11.5, H: 5.5, B: 3.2

COMPARATIVE EXAMPLE 3

Production of Polyhydrotitanosilazane

To a 200 ml four-necked flask equipped with a gas feed conduit, a dropping funnel, a thermometer and a magnetic stirrer, a dry nitrogen gas was fed for replacing the air therewith. Then, 110 g of a solution of the perhydropolysilazane obtained in Reference Example 1 in benzene (concentration of perhydropolysilazane: 4.57% by weight) was charged into the flask. A solution of 6.30 g (22.2 mmol) of titanium isopropoxide in 6.5 ml dry benzene was added into the solution in the flask using a syringe with stirring and the mixture was reacted. As a result, the colorless reaction mixture was turned brown, purple and finally black. After completion of the reaction, the solvent was removed in vacuo to obtain polyhydrotitanosilazane with a yield of 84% by weight.

Figure 18:
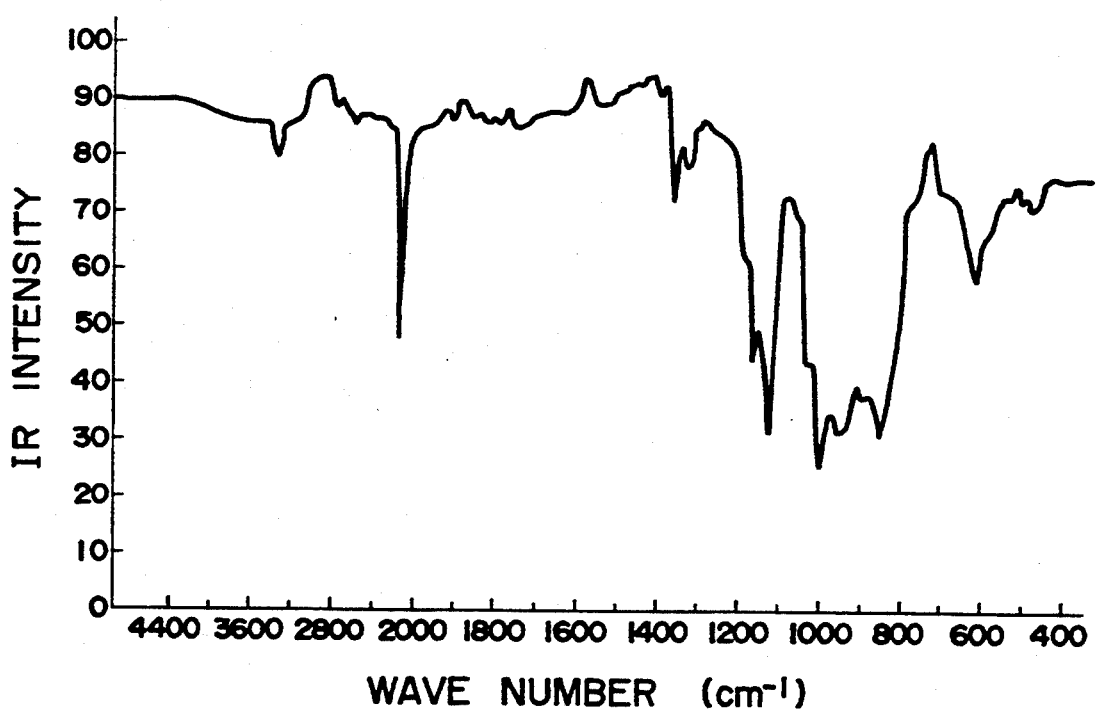
FIG. 18 is the infrared spectrum of the polymer produced in Comparative Example 3 below.

The cryoscopic method using dry benzene as a solvent revealed that the polyhydrotitanosilazane had a number-average molecular weight of 1,840. The infrared spectrum of this polymer (solvent: dry benzene) is shown in FIG. 18. There are absorption peaks based on $(CH_3)_2CH$— (at 1,365 and 1,335 cm$^{-1}$), peaks based on (C-O)Ti (at 1,160, 1,125 and 1,000 cm$^{-1}$), peaks based on SiOTi and (C-O)Ti (at 950–1,100 cm$^{-1}$ and a peak based on Ti-O (615 cm$^{-1}$) in addition to a peak based on NH (3,350 cm$^{-1}$) and a peak based on Si-H (2,170 cm$^{-1}$). The elementary analysis of the polymer gave the following results (in terms of % by weight):

Si: 33.0, N: 14.0, C: 23.4, O: 11.8, H: 6.6, Ti: 9.5

COMPARATIVE EXAMPLE 4

Production of Polyhydrotitanosilazane

To a 200 ml four-necked flask equipped with a gas feed conduit, a dropping funnel, a thermometer and a magnetic stirrer, a dry nitrogen gas was fed for replacing the air therewith. Then, 2.93 g of the polymethyl(hydro)silazane obtained in Reference Example 2 and 80 ml of dry o-xylene were charged into the flask, into which 3.46 g (11.9 mmol) of titanium isopropoxide were added with stirring and the mixture was reacted at a temperature of 130°–135° C. As a result, the colorless reaction mixture was turned yellow. After completion of the reaction, the solvent was removed in vacuo to obtain polytitanosilazane in the form of yellow solids with a yield of 61.6% by weight.

Figure 19:
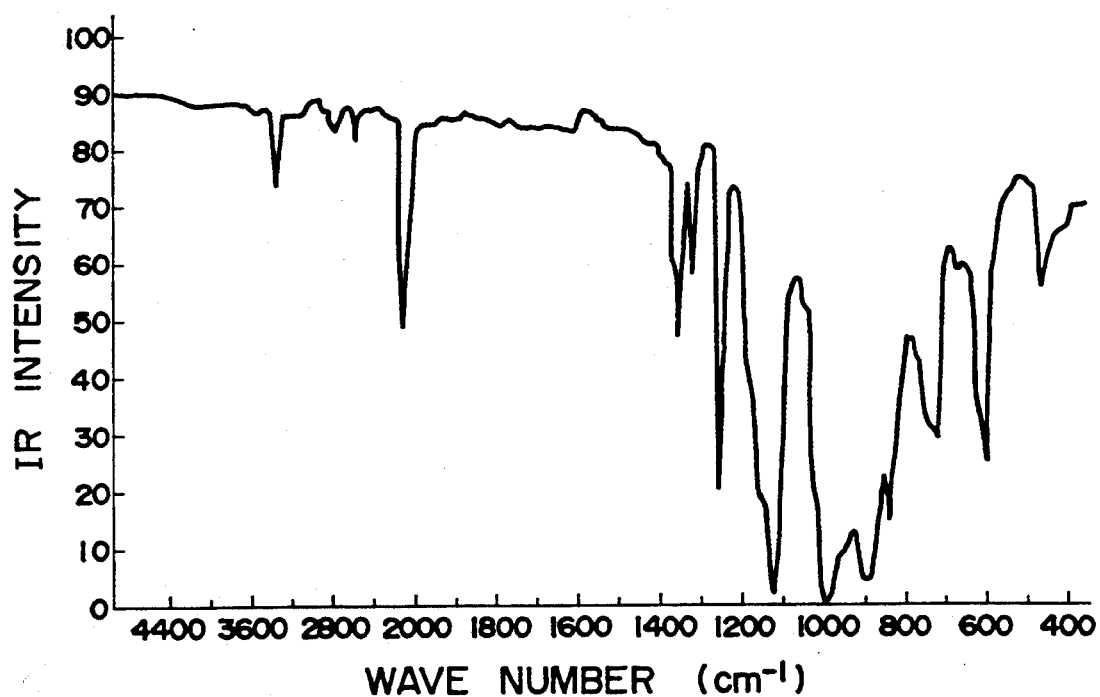
FIG. 19 is the infrared spectrum of the polymer produced in Comparative Example 4 below.

The cryoscopic method using dry benzene as a solvent revealed that the polyhydrotitanosilazane had a number-average molecular weight of 1,510. The infrared spectrum of this polymer (solvent: dry benzene) is shown in FIG. 19. There are absorption peaks based on $(CH_3)_2CH$— (at 1,360 and 1,330 cm$^{-1}$), peaks based on SiOTi and (C-O)Ti (at 1,160, 1,120 and 995 cm$^{-1}$) and a peak based on Ti-O (615 cm$^{-1}$) in addition to a peak based on NH (3,380 cm$^{-1}$) and a peak based on Si-H (2,120 cm$^{-1}$). The elementary analysis of the polymer gave the following results (in terms of % by weight):

Si: 36.4, N: 17.8, C: 27.1, O: 6.6, H: 5.9, Ti: 5.3

COMPARATIVE EXAMPLE 5

Production of Polyhydroaluminosilazane

To a 200 ml four-necked flask equipped with a gas feed conduit, a dropping funnel, a thermometer and a magnetic stirrer, a dry nitrogen gas was fed for replacing the air therewith. Then, 1.50 g (7.34 mmol) of aluminum isopropoxide were charged into the flask, into which 83 ml of a solution of the perhydropolysilazane obtained in Reference Example 1 in benzene (concentration of perhydropolysilazane: 40.72 g/l) was added using a syringe with stirring. The mixture was reacted at 80° C. under reflux in the atmosphere of argon for 2 hours, whereupon the colorless reaction mixture was turned light yellow. After completion of the reaction, the solvent was removed in vacuo to obtain polyhydroaluminosilazane with a yield of 89% by weight.

Figure 20:
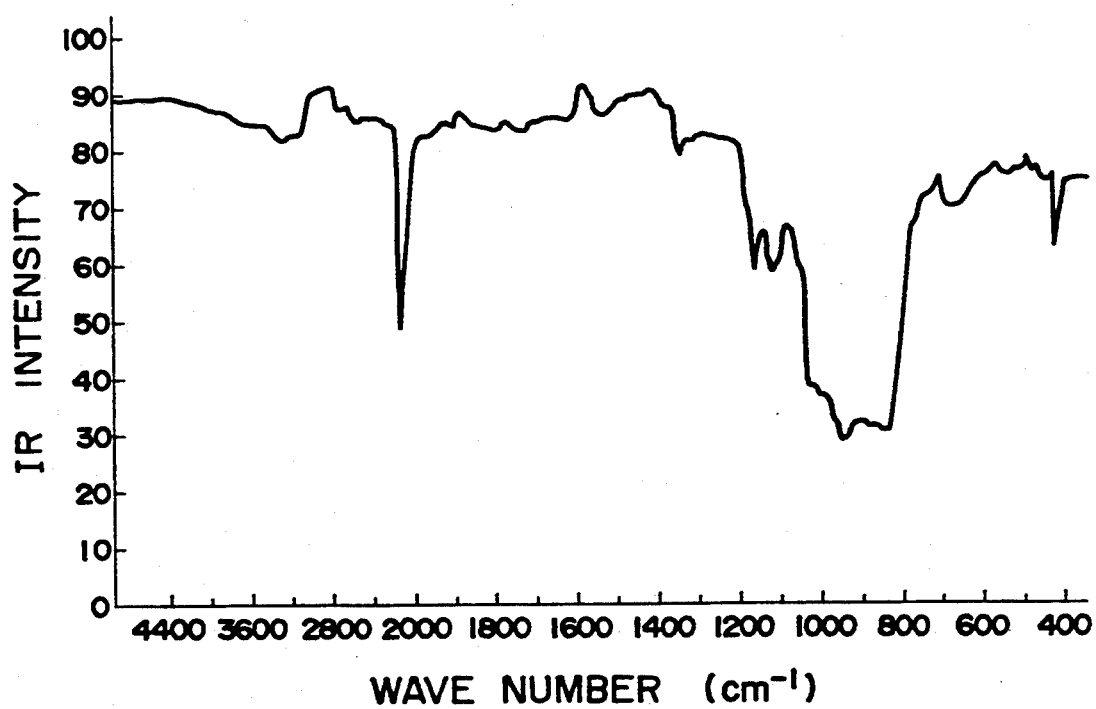
FIG. 20 is the infrared spectrum of the polymer produced in Comparative Example 5 below.

The cryoscopic method using dry benzene as a solvent revealed that the polyhydroaluminosilazane had a number-average molecular weight of 1,710. The infrared spectrum of this polymer (solvent: dry benzene) is shown in FIG. 20. There are absorption peaks based on (C-O)Al (at 1,380 and 1,200 cm$^{-1}$) and based on SiOAl (at 1,100 cm$^{-1}$) in addition to peaks based on NH (3,350 cm$^{-1}$) and based on Si-H (2,170 cm$^{-1}$). The elementary analysis of the polymer gave the following results (in terms of % by weight):

Si: 45.6, N: 23.9, C: 12.8, O: 8.8, H: 5.5, Al: 4.4

COMPARATIVE EXAMPLE 6

Production of Polyaluminosilazane

To a 500 ml four-necked flask equipped with a gas feed conduit, a dropping funnel, a thermometer and a magnetic stirrer, a dry nitrogen gas was fed for replacing the air therewith. Then, 4.5 g (22.0 mmol) of aluminum isopropoxide were charged into the flask, into which 300 ml of a solution of the polymethylhydrosilazane obtained in Reference Example 2 in o-xylene (concentration of polysilazane: 20.4 g/l) was added using a syringe with stirring. The mixture was reacted at 130° C. under reflux in the atmosphere of nitrogen for 48 hours, whereupon the colorless reaction mixture was turned light yellow. After completion of the reaction, the solvent was removed in vacuo to obtain polyaluminosilazane with a yield of 75% by weight.

Figure 21:
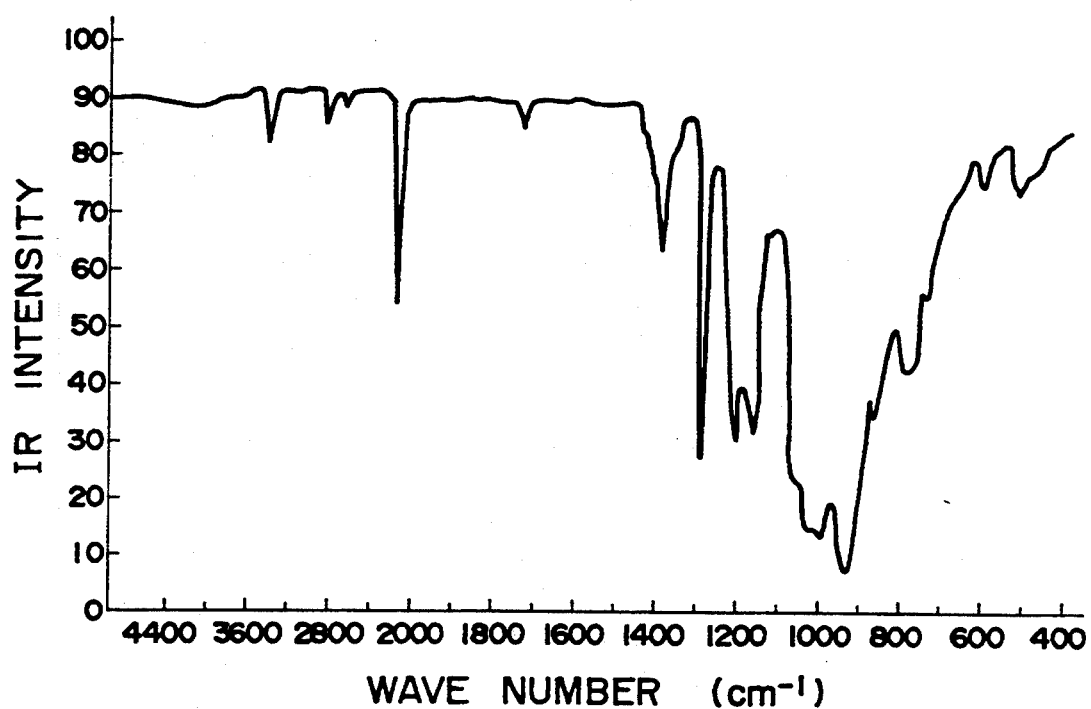
FIG. 21 is the infrared spectrum of the polymer produced in Comparative Example 6 below.

The cryoscopic method using dry benzene as a solvent revealed that the polyaluminosilazane had a number-average molecular weight of 1,500. The infrared spectrum of this polymer (solvent: dry benzene) is shown in FIG. 21. There are absorption peaks based on NH (3,350 cm$^{-1}$) and based on Si-H (2,170 cm$^{-1}$). The elementary analysis of the polymer gave the following results (in terms of % by weight):

Si: 35.8, N: 17.5, C: 26.6, O: 8.7, H: 6.1, Al: 4.61

COMPARATIVE EXAMPLE 7

Production of Polyzirconosilazane

To a 100 ml four-necked flask equipped with a gas feed conduit, a dropping funnel, a thermometer and a magnetic stirrer, a dry nitrogen gas was fed for replacing the air therewith. Then, 63.4 g of a solution of the perhydropolysilazane obtained in Reference Example 1 in o-xylene (concentration of perhydropolysilazane: 4.45% by weight) were charged into the flask. A solution of 4.00 g (12.2 mmol) of zirconium isopropoxide dissolved in 6.0 ml dry benzene was added into the solution in the flask using a syringe with stirring. The resulting mixture was reacted at 90° C. in the atmosphere of nitrogen, whereupon the colorless reaction mixture was turned light yellow. After completion of the reaction, the solvent was removed in vacuo to obtain polyzirconosilazane.

Figure 22:
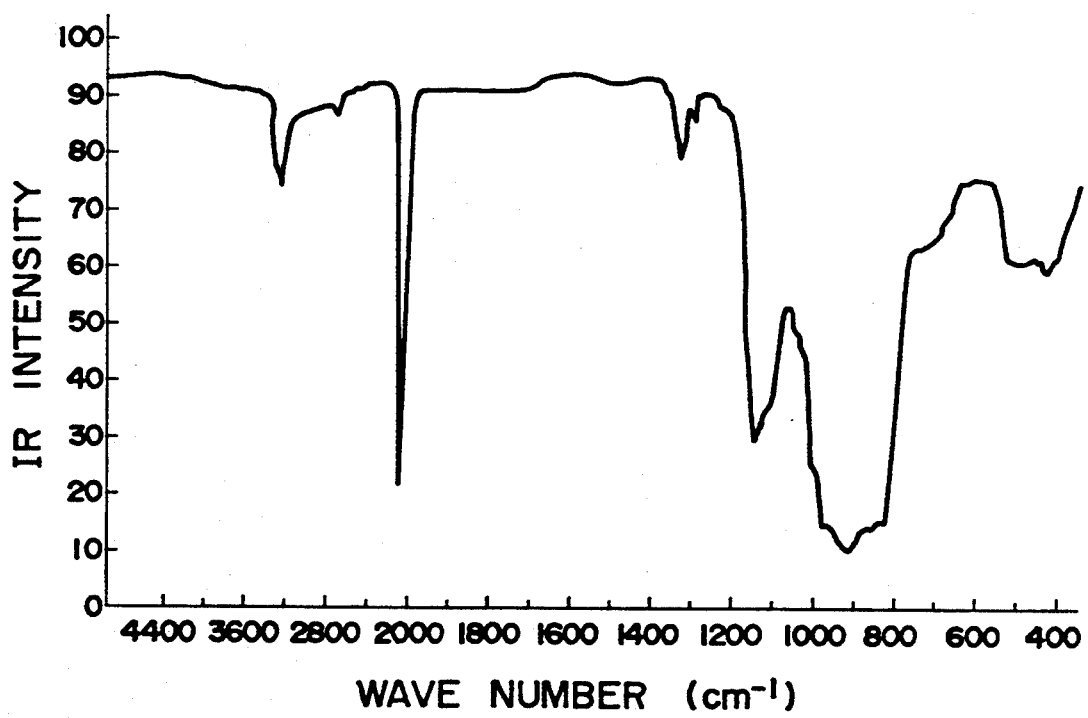
FIG. 22 is the infrared spectrum of the polymer produced in Comparative Example 7 below.

The cryoscopic method using dry benzene as a solvent revealed that the polyzirconosilazane had a number-average molecular weight of 2,100. The infrared spectrum of this polymer (solvent: dry benzene) is shown in FIG. 22. There are absorption peaks based on (CH$_3$)2CH- (at 1,365 and 1,335 cm$^{-1}$), peaks based on (C-O)Zr (at 1,170) and a peak based on SiOZr and (C-O)Zr (at 950 cm$^{-1}$) in addition to a peak based on NH (3350 cm$^{-1}$) and a peak based on Si-H (2,170 cm$^{-1}$). The elementary analysis of the polymer gave the following results (in terms of % by weight):

Si: 34.0, N: 13.0, C: 14.4, O: 13.2, H: 5.1, Zr: 18.6

COMPARATIVE EXAMPLE 8

Production of Polyzirconosilazane

To a 500 ml four-necked flask equipped with a gas feed conduit, a dropping funnel, a thermometer and a magnetic stirrer, a dry nitrogen gas was fed for replacing the air therewith. Then, 7.33 g of the polymethyl(-hydro)silazane obtained in Reference Example 2 and 250 ml of dry o-xylene were charged into the flask, into which 11.4 g (34.7 mmol) of zirconium isopropoxide were added with stirring. The mixture was then reacted at 130°-135° C. After completion of the reaction, the solvent was removed in vacuo to obtain polyzirconosilazane.

Figure 23:
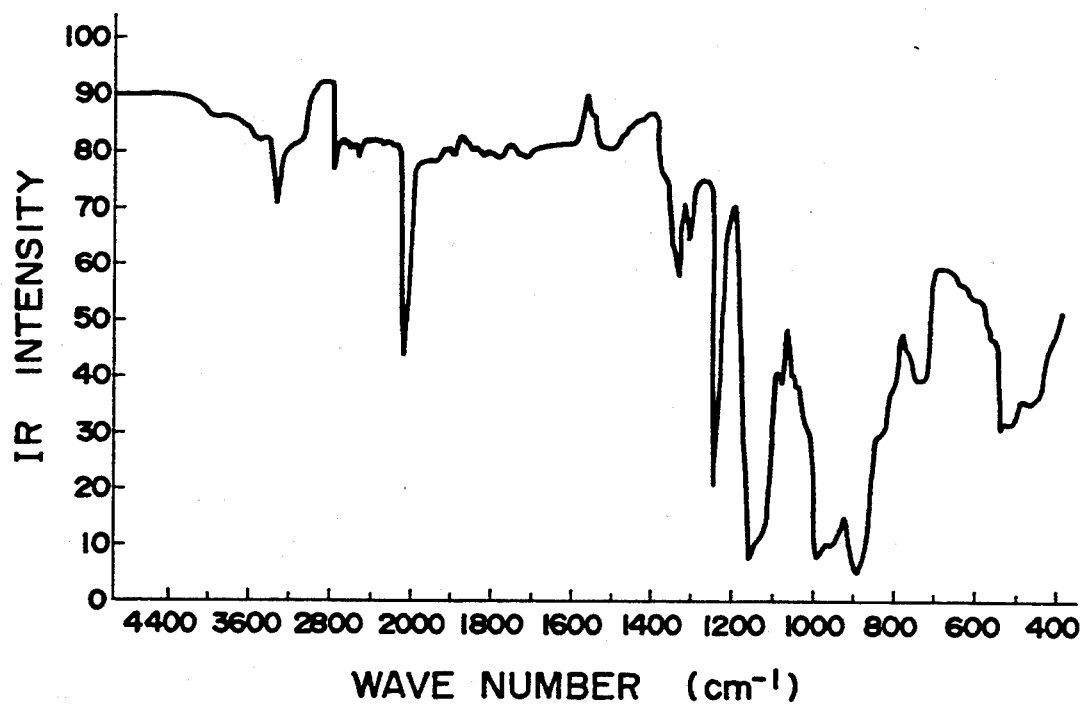
FIG. 23 is the infrared spectrum of the polymer produced in Comparative Example 8 below.

The cryoscopic method using dry benzene as a solvent revealed that the polyzirconosilazane had a number-average molecular weight of 1,750. The infrared spectrum of this polymer (solvent: dry benzene) is shown in FIG. 23. There are absorption peaks based on (CH$_3$)2CH— (at 1,360 and 1,340 cm$^{-1}$) and peaks based on (C-O)Zr (at 1,170 and 1,000 cm$^{-1}$) in addition to a peak based on NH (3,380 cm$^{-1}$) and a peak based on Si-H (2,120 cm$^{-1}$). The elementary analysis of the polymer gave the following results (in terms of % by weight):

Si: 28.0, N: 13.5, C: 27.5, O: 9.0, H: 5.4, Zr: 14.6

EXAMPLE 1

Production of Polyborosilazane

To a 500 ml four-necked flask equipped with a gas feed conduit, a dropping funnel, a thermometer and a magnetic stirrer, a dry nitrogen gas was fed for replacing the air therewith. Then, 110 g of a solution of the perhydropolysilazane obtained in Reference Example 1 in benzene (concentration of perhydropolysilazane: 4.57% by weight) was charged into the flask. A solution of 29.0 g (279 mmol) of trimethyl borate (B(OCH$_3$)3) in 6.5 ml dry benzene was added into the solution in the flask using a syringe with stirring and, further, 134.8 g (837 mmol) of hexamethyldisilazane ((CH$_3$)$_3$SiNH-Si(CH$_3$)$_3$)) were added into the flask using a syringe. The resulting mixture was reacted at 160° C., whereupon the colorless reaction mixture was turned light yellow. After completion of the reaction, the solvent was removed in vacuo to obtain light yellow solids with a yield of 95% by weight.

The cryoscopic method using dry benzene as a solvent revealed that the polyborosilazane had a number-average molecular weight of 1,810. The infrared spectrum of this polymer (solvent: dry benzene) is shown in FIG. 1. There are absorption peaks based on CH$_3$ and OCH$_3$ (at 2,960 and 2,850 cm$^{-1}$) and a broad peak based on B-O and B-N (1,300–1,540 cm$^{-1}$) in addition to a peak based on NH (3,350 cm$^{-1}$) and a peak based on Si-H (2,170 cm$^{-1}$). No absorption peak based on Si-o is observed at 1,100 cm$^{-1}$. The elementary analysis of the polymer gave the following results (in terms of % by weight):

Si: 46.3, N: 28.3, C: 9.6, O: 3.8, H: 7.5, B: 4.5

Production of Ceramics

Part of the thus obtained polyborosilazane was dissolved in toluene and the solution was adjusted to a predetermined concentration. The solution was then poured into a mold cavity of a mold formed of a tetrafluoroethylene. Then the solvent was removed at 200° C. under a nitrogen stream to obtain a transparent shaped mass having a size of 20 mmo × 10 mm. This was heated to 1,000° C. in the atmosphere of ammonia at a heating rate of 1° C./min and then to 1,600° C. in a nitrogen atmosphere at a heating rate of 10° C./min, and further maintained at that temperature for 10 hours, thereby obtaining white, disk-like ceramic body. Elementary analysis of the shaped ceramic body gave the following results (in terms of % by weight):

Si: 50.2, N: 39.1, C: 1.5, O: 4.1, B: 5.1

Powder X-ray diffraction analysis revealed that the shaped body was amorphous. The shaped body had a three-point bending strength of 5.6 MPa.

Another part of the polyborosilazane obtained above was processed to obtain ceramic fibers. Thus, the polyborosilazane was dissolved in xylene and the solvent was removed in vacuo. The removal of the solvent was stopped when the solution had desired spinnability. The resultant solution was charged in a defoaming vessel of a dry-spinning device and maintained in quiescent state at 60° C. for about 2 hours to effect defoaming. Then, the solution was injected at 30° C. through a nozzle having a nozzle diameter of 0.1 mm into a cylinder maintained at 130° C. under ambient dry air, and the spun fiber was taken up at a speed of 300 m/min on a bobbin, thereby obtaining a fiber having an average diameter of 12 μm. While applying a tension of 500 g/mm$^2$, this fiber was heated from room temperature to 1,000° C. at a heating rate of 1° C./min in an ammoniacal atmosphere and then to 1,600° C. at a heating rate of 10° C./min in a nitrogen atmosphere and maintained at 1,600° C. for 1 hour to effect pyrolysis, thereby obtaining ceramic fiber. This fiber was found to have a tensile strength of 130–450 kgf/mm$^2$ (average: 200 kgf/mm$^2$. Elementary analysis of the ceramic fiber gave the following results (in terms of % by weight):

Si: 50.0, N: 38.1, C: 1.5, O: 5.4, B: 5.0

EXAMPLE 2

Production of Polyborosilazane

To a 500 ml four-necked flask equipped with a gas feed conduit, a dropping funnel, a thermometer and a magnetic stirrer, a dry nitrogen gas was fed for replacing the air therewith. Then, 110 g of a solution of the perhydropolysilazane obtained in Reference Example 1 in benzene (concentration of perhydropolysilazane: 4.57% by weight) was charged into the flask. A solution of 29.0 g (279 mmol) of trimethyl borate (B(OCH$_3$)$_3$) in 6.5 ml dry benzene was added into the solution in the flask using a syringe with stirring and, further, 90.8 g (837 mmol) of trimethylchlorosilane ((CH$_3$)$_3$SiCl) were added into the flask using a syringe. The resulting mixture was reacted at 160° C., whereupon the colorless reaction mixture was turned light yellow. After completion of the reaction, the solvent was removed in vacuo to obtain light yellow solids with a yield of 94% by weight.

Figure 2:
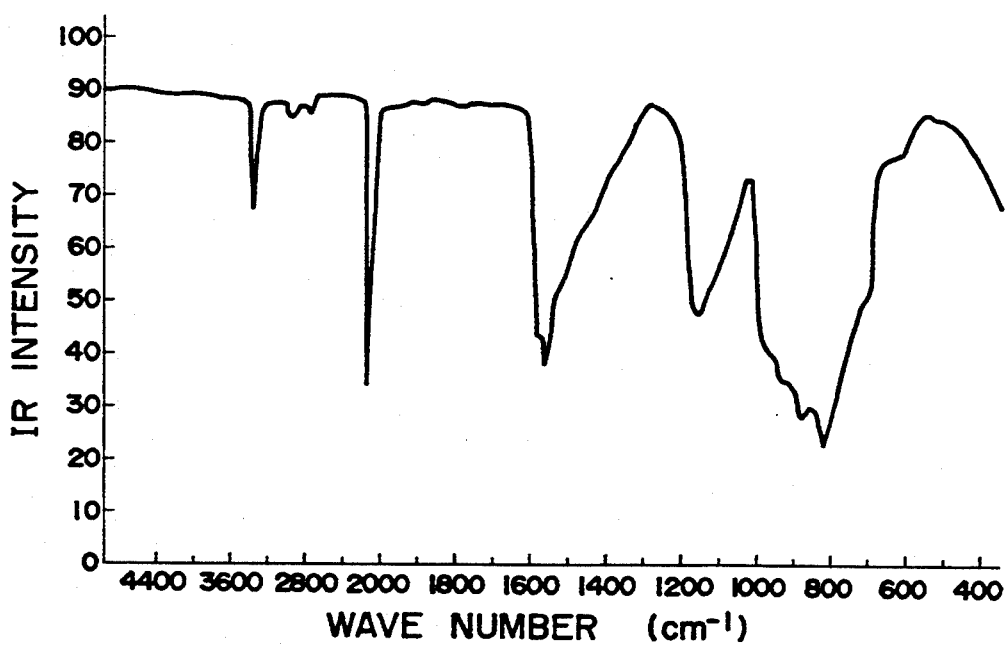
FIG. 2 is the infrared spectrum of the polymer produced in Example 2 below, in accordance with the present invention.

The cryoscopic method using dry benzene as a solvent revealed that the polyborosilazane had a number-average molecular weight of 1,900. The infrared spectrum of this polymer (solvent: dry benzene) is shown in FIG. 2. There are absorption peaks based on CH$_3$ and OCH$_3$ (at 2,960 and 2,850 cm$^{-1}$) and peaks based on B-O and B-N (1,300–1,540 cm$^{-1}$) in addition to a peak based on NH (3,350 cm$^{-1}$) and a peak based on Si-H (2,170 cm$^{-1}$). No absorption peak based on Si-O is observed at 1,100 cm$^{-1}$. The elementary analysis of the polymer gave the following results (in terms of % by weight):

Si: 45.1, N: 27.2, C: 11.7, O: 4.1, H: 7.2, B: 4.4

Production of Ceramics

Part of the thus obtained polyborosilazane was dissolved in toluene and the solution was adjusted to a predetermined concentration. The solution was then poured into a mold cavity of a mold formed of a tetrafluoroethylene. Then the solvent was removed at 200° C. under a nitrogen stream to obtain a transparent shaped mass having a size of 20 mmo×10 mm. This was heated to 1,000° C. in the atmosphere of ammonia at a heating rate of 1° C./min and then to 1,600° C. in a nitrogen atmosphere at a heating rate of 10° C./min, and further maintained at that temperature for 10 hours, thereby obtaining white, disk-like ceramic body. Elementary analysis of the shaped ceramic body gave the following results (in terms of % by weight):

Si: 49.1, N: 39.6, C: 2.5, O: 4.2, B: 4.6

Powder X-ray diffraction analysis revealed that the shaped body was amorphous. The shaped body had a three-point bending strength of 4.3 MPa.

EXAMPLE 3

Production of Polyborosilazane

To a 500 ml four-necked flask equipped with a gas feed conduit, a dropping funnel, a thermometer and a magnetic stirrer, a dry nitrogen gas was fed for replacing the air therewith. Then, 110 g of a solution of the perhydropolysilazane obtained in Reference Example 1 in benzene (concentration of perhydropolysilazane: 4.57% by weight) was charged into the flask. A solution of 29.0 g (279 mmol) of trimethyl borate (B(OCH$_3$)$_3$) in 6.5 ml dry benzene was added into the solution in the flask using a syringe with stirring and, further, 98.0 g (837 mmol) of trimethylsilylamine ((CH$_3$)$_3$SiNH$_2$) were added into the flask using a syringe. The resulting mixture was reacted at 160° C., whereupon the colorless reaction mixture was turned light yellow. After completion of the reaction, the solvent was removed in vacuo to obtain light yellow solids with a yield of 95% by weight.

Figure 3:
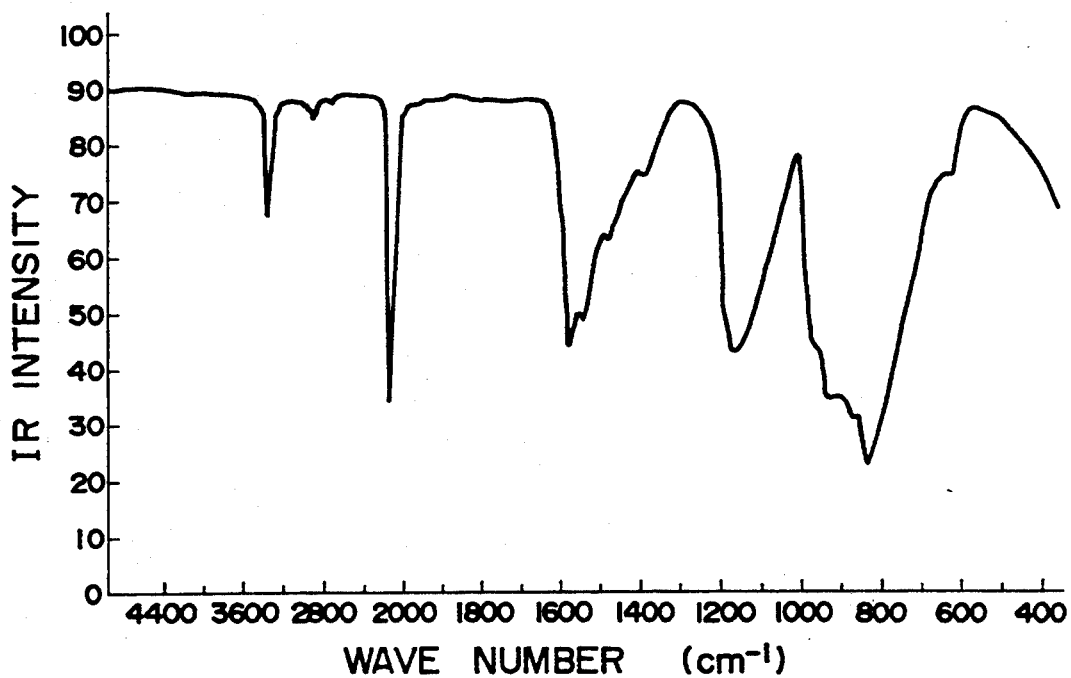
FIG. 3 is the infrared spectrum of the polymer produced in Example 3 below, in accordance with the present invention.

The cryoscopic method using dry benzene as a solvent revealed that the polyborosilazane had a number-average molecular weight of 1,860. The infrared spectrum of this polymer (solvent: dry benzene) is shown in FIG. 3. There are absorption peaks based on CH$_3$ and OCH$_3$ (at 2,960 and 2,850 cm$^{-1}$) and peaks based on B-O and B-N (1,300–1,540 cm$^{-1}$) in addition to a peak based on NH (3,350 cm$^{-1}$) and a peak based on Si-H (2,170 cm$^{-1}$). No absorption peak based on Si-O is observed at 1,100 cm$^{-1}$. The elementary analysis of the polymer gave the following results (in terms of % by weight):

Si: 45.9, N: 29.5, C: 10.1, O: 3.0, H: 7.0, B: 4.5

Production of Ceramics

Part of the thus obtained polyborosilazane was dissolved in toluene and the solution was adjusted to a predetermined concentration. The solution was then poured into a mold cavity of a mold formed of a tetrafluoroethylene. Then the solvent was removed at 200° C. under a nitrogen stream to obtain a transparent shaped mass having a size of 20 mmo×10 mm. This was heated to 1,000° C. in the atmosphere of ammonia at a heating rate of 1° C./min and then to 1,600° C. in a nitrogen atmosphere at a heating rate of 10° C./min, and further maintained at that temperature for 10 hours, thereby obtaining white, disk-like ceramic body. Elementary analysis of the shaped ceramic body gave the following results (in terms of % by weight):

Si: 50.5, N: 40.6, C: 1.1, O: 3.2, B: 4.6

Powder X-ray diffraction analysis revealed that the shaped body was amorphous. The shaped body had a three-point bending strength of 5.6 MPa.

EXAMPLE 4

Production of Polyborosilazane

To a 500 ml four-necked flask equipped with a gas feed conduit, a dropping funnel, a thermometer and a magnetic stirrer, a dry nitrogen gas was fed for replacing the air therewith. Then, 110 g of a solution of the perhydropolysilazane obtained in Reference Example 1 in benzene (concentration of perhydropolysilazane: 4.57% by weight) was charged into the flask. A solution of 29.0 g (279 mmol) of trimethyl borate (B(OCH$_3$)$_3$) in 6.5 ml dry benzene was added into the solution in the flask using a syringe with stirring and, further, 192.5 g (837 mmol) of hexaethyldisilane ((C$_2$H$_5$)$_3$Si$_2$(C$_2$H$_5$)$_3$) were added into the flask using a syringe. The resulting mixture was reacted 160° C., whereupon the colorless reaction mixture was turned light yellow. After completion of the reaction, the solvent was removed in vacuo to obtain light yellow solids with a yield of 90% by weight.

Figure 4:
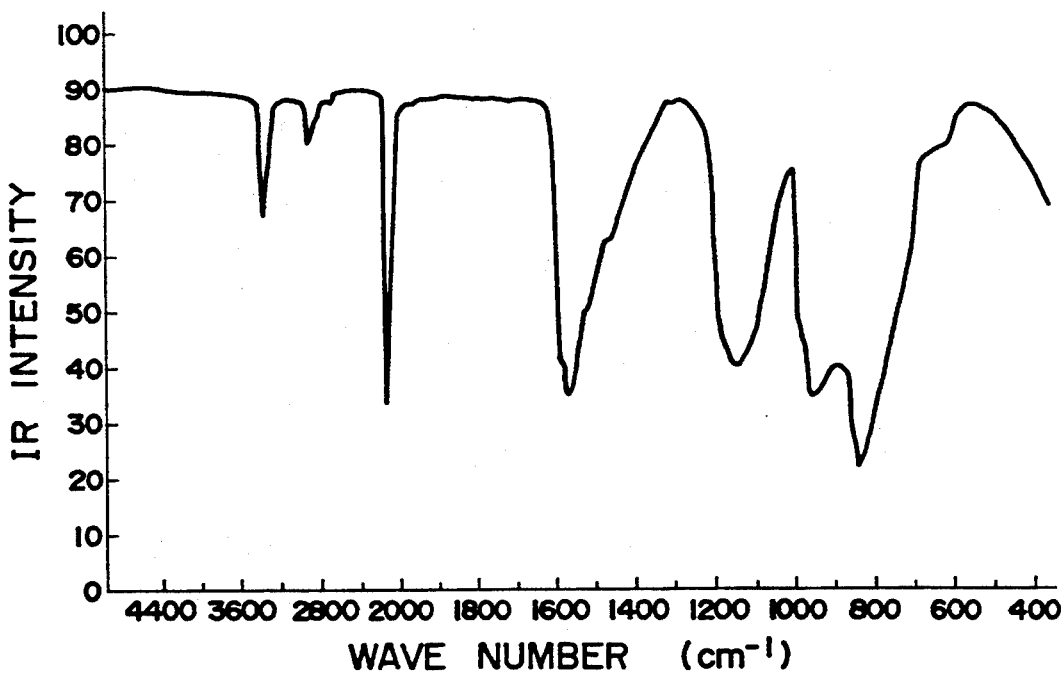
FIG. 4 is the infrared spectrum of the polymer produced in Example 4 below, in accordance with the present invention.

The cryoscopic method using dry benzene as a solvent revealed that the polyborosilazane had a number-average molecular weight of 1,750. The infrared spectrum of this polymer (solvent: dry benzene) is shown in FIG. 4. There are absorption peaks based on CH$_3$ and OCH$_3$ (at 2,960 and 2,850 cm$^{-1}$) and peaks based on B-O and B-N (1,300–1,540 cm$^{-1}$) in addition to a peak based on NH (3,350 cm$^{-1}$) and a peak based on Si-H (2,170 cm$^{-1}$). No absorption peak based on Si-O is observed at 1,100 cm$^{-1}$. The elementary analysis of the polymer gave the following results (in terms of % by weight):

Si: 45.0, N: 28.1, C: 11.1, O: 4.5, H: 6.9, B: 4.4

Production of Ceramics

Part of the thus obtained polyborosilazane was dissolved in toluene and the solution was adjusted to a predetermined concentration. The solution was then poured into a mold cavity of a mold formed of a tetrafluoroethylene. Then the solvent was removed at 200° C. under a nitrogen stream to obtain a transparent shaped mass having a size of 20 mmo × 10 mm. This was heated to 1,000° C. in the atmosphere of ammonia at a heating rate of 1° C./min and then to 1,600° C. in a nitrogen atmosphere at a heating rate of 10° C./min, and further maintained at that temperature for 10 hours, thereby obtaining white, disk-like ceramic body. Elementary analysis of the shaped ceramic body gave the following results (in terms of % by weight):

Si: 50.0, N: 38.9, C: 2.0, O: 4.6, B: 4.5

Powder X-ray diffraction analysis revealed that the shaped body was amorphous. The shaped body had a three-point bending strength of 7.9 MPa.

EXAMPLE 5

Production of Polyborosilazane

To a 500 ml four-necked flask equipped with a gas feed conduit, a dropping funnel, a thermometer and a magnetic stirrer, a dry nitrogen gas was fed for replacing the air therewith. Then, 2.93 g of the polymethyl(-hydro)silazane obtained in Reference Example 2 and 80 ml of dry o-xylene were charged into the flask, into which 1.29 g (12.4 mmol) of trimethyl borate (B(OCH$_3$)$_3$) was added with stirring and, further, 3.87 g (37.2 mmol) of hexamethyldisilazane ((CH$_3$)$_3$SiNH-Si(CH$_3$)$_3$)) were added into the flask using a syringe. The mixture was then reacted at 200° C., whereupon the colorless reaction mixture was turned light yellow. After completion of the reaction, the solvent was removed in vacuo to obtain light yellow solids with a yield of 92% by weight.

Figure 5:
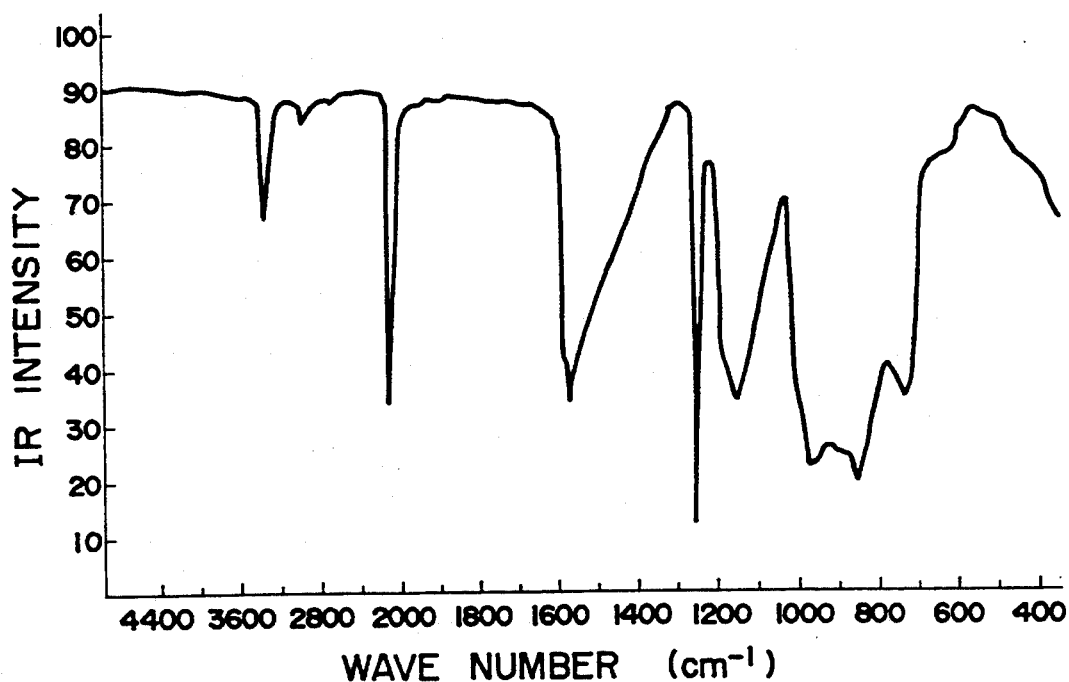
FIG. 5 is the infrared spectrum of the polymer produced in Example 5 below, in accordance with the present invention.

The cryoscopic method using dry benzene as a solvent revealed that the polyborosilazane had a number-average molecular weight of 2,100. The infrared spectrum of this polymer (solvent: dry benzene) is shown in FIG. 5. There are absorption peaks based on CH$_3$ and OCH$_3$ (at 2,960 and 2,850 cm$^{-1}$) and peaks based on B-O and B-N (1,300–1,540 cm$^{-1}$) in addition to a peak based on NH (3350 cm$^{-1}$) and a peak based on Si-H (2,170 cm$^{-1}$). No peak based on Si-O (1,100 cm$^{-1}$) was observed. The elementary analysis of the polymer gave the following results (in terms of % by weight):

Si: 35.5, N: 20.5, C: 31.5, O: 3.0, H: 6.2, B: 3.3

Production of Ceramics

Part of the thus obtained polyborosilazane was dissolved in toluene and the solution was adjusted to a predetermined concentration. The solution was then poured into a mold cavity of a mold formed of a tetrafluoroethylene. Then the solvent was removed at 200° C. under a nitrogen stream to obtain a transparent shaped mass having a size of 20 mmo × 10 mm. This was heated to 1,000° C. in the atmosphere of ammonia at a heating rate of 1° C./min and then to 1,600° C. in a nitrogen atmosphere at a heating rate of 10° C./min, and further maintained at that temperature for 10 hours, thereby obtaining white, disk-like ceramic body. Elementary analysis of the shaped ceramic body gave the following results (in terms of % by weight):

Si: 47.6, N: 36.8, C: 8.5, O: 3.2, B: 3.9

Powder X-ray diffraction analysis revealed that the shaped body was amorphous. The shaped body had a three-point bending strength of 5.0 MPa.

Another part of the polyborosilazane obtained above was processed to obtain ceramic fibers. Thus, the polyborosilazane was dissolved in xylene and the solvent was removed in vacuo. The removal of the solvent was stopped when the solution had desired spinnability. The resultant solution was charged in a defoaming vessel of a dry-spinning device and maintained in quiescent state at 60° C. for about 2 hours to effect defoaming. Then, the solution was injected at 30° C. through a nozzle having a nozzle diameter of 0.1 mm into a cylinder maintained at 130° C. under ambient dry air, and the spun fiber was taken up at a speed of 300 m/min on a bobbin, thereby obtaining a fiber having an average diameter of 12 μm. While applying a tension of 500 g/mm$^2$, this fiber was heated from room temperature to 1,000° C. at a heating rate of 1° C./min in an ammoniacal atmosphere and then to 1,600 ° C. at a heating rate of 10° C./min in a nitrogen atmosphere and maintained at 1,600° C. for 1 hour to effect pyrolysis, thereby obtaining ceramic fiber. This fiber was found to have a tensile strength of 100–390 kgf/mm$^2$ (average: 180 kgf/mm$^2$. Elementary analysis of the ceramic fiber gave the following results (in terms of % by weight):

Si: 48.0, N: 37.6, C: 7.5, O: 6.9, B: 5.0

EXAMPLE 6

Production of Polyhydrotitanosilazane

To a 500 ml four-necked flask equipped with a gas feed conduit, a dropping funnel, a thermometer and a magnetic stirrer, a dry nitrogen gas was fed for replacing the air therewith. Then, 110 g of a solution of the perhydropolysilazane obtained in Reference Example 1 in benzene (concentration of perhydropolysilazane: 4.57% by weight) was charged into the flask. A solution of 6.30 g (22.2 mmol) of titanium isopropoxide in 6.5 ml dry benzene was added into the solution in the flask using a syringe with stirring and, further, 14.3 g (88.8 mmol) of hexamethyldisilazane (($CH_3$)$_3$SiNHSi($CH_3$)$_3$)) were added into the flask using a syringe. The mixture was then reacted so that the colorless reaction mixture was turned brown, purple and finally black. After completion of the reaction, the solvent was removed in vacuo to obtain polyhydrotitanosilazane with a yield of 92% by weight.

Figure 6:
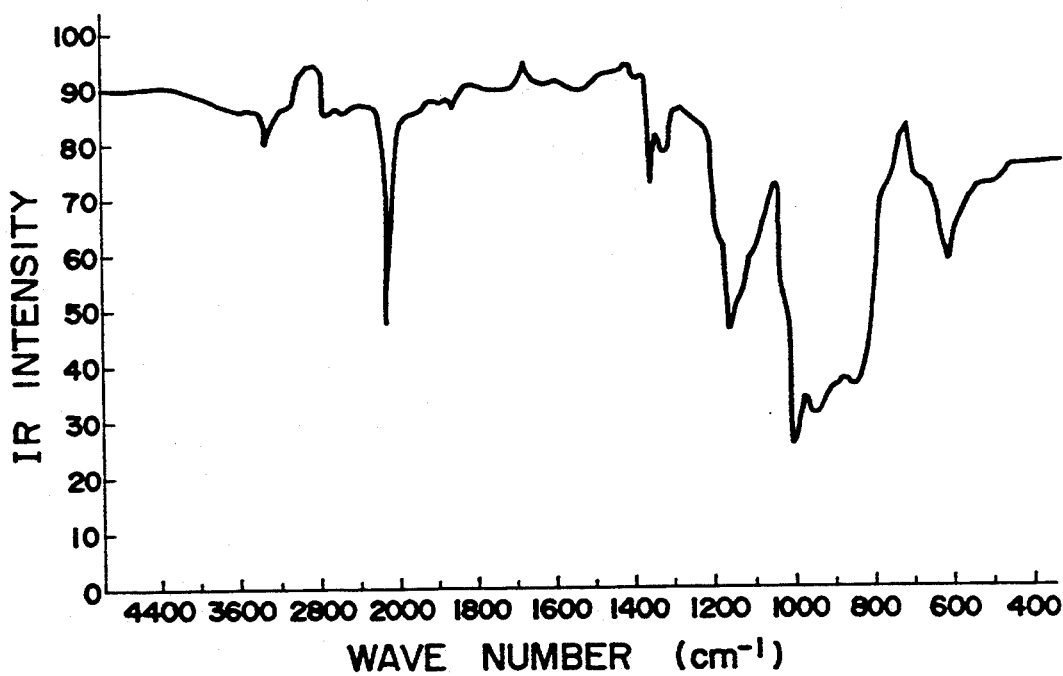
FIG. 6 is the infrared spectrum of the polymer produced in Example 6 below, in accordance with the present invention.

The cryoscopic method using dry benzene as a solvent revealed that the polyhydrotitanosilazane had a number-average molecular weight of 2,100. The infrared spectrum of this polymer (solvent: dry benzene) is shown in FIG. 6. There are absorption peaks based on ($CH_3$)$_2$CH— (at 1,365 and 1,335 $cm^{-1}$), peaks based on (C-O)Ti (at 1,160, 1,125 and 1,000 $cm^{-1}$), peaks based on (C-O)Ti (at 950 $cm^{-1}$ and a peak based on Ti-O (615 $cm^{-1}$) in addition to a peak based on NH (3,350 $cm^{-1}$) and a peak based on Si-H (2,170 $cm^{-1}$). No peak based on SiO (1,100 $cm^{-1}$) was observed. The elementary analysis of the polymer gave the following results (in terms of % by weight):
Si: 44.2, N: 22.0, C: 11.9, O: 2.9, H: 7.2, Ti: 11.2

Production of Ceramics

Part of the thus obtained polyhydrotitanosilazane was dissolved in toluene and the solution was adjusted to a predetermined concentration. The solution was then poured into a mold cavity of a mold formed of a tetrafluoroethylene. Then the solvent was removed at 200° C. under a nitrogen stream to obtain a transparent shaped mass having a size of 20 mmo×10 mm. This was heated to 1,000° C. in the atmosphere of ammonia at a heating rate of 1° C./min and then to 1,600° C. in a hydrogen atmosphere at a heating rate of 10° C./min, and further maintained at that temperature for 10 hours, thereby obtaining white, disk-like ceramic body. Elementary analysis of the shaped ceramic body gave the following results (in terms of % by weight):
Si: 50.4, N: 32.9, C: 1.6, O: 3.0, Ti: 12.1
Powder X-ray diffraction analysis revealed that the shaped body was amorphous. The shaped body had a three-point bending strength of 10.5 MPa.

Another part of the polyhydrotitanosilazane obtained above was processed to obtain ceramic fibers. Thus, the polyhydrotitanosilazane was dissolved in xylene and the solvent was removed in vacuo. The removal of the solvent was stopped when the solution had desired spinnability. The resultant solution was charged in a defoaming vessel of a dry-spinning device and maintained in quiescent state at 60° C. for about 2 hours to effect defoaming. Then, the solution was injected at 30° C. through a nozzle having a nozzle diameter of 0.1 mm into a cylinder maintained at 130° C. under ambient dry air, and the spun fiber was taken up at a speed of 300 m/min on a bobbin, thereby obtaining a fiber having an average diameter of 12 μm. While applying a tension of 500 g/mm$^2$, this fiber was heated from room temperature to 1,000° C. at a heating rate of 1° C./min in an ammoniacal atmosphere and then to 1,600 ° C. at a heating rate of 10° C./min in a nitrogen atmosphere and maintained at 1,600° C. for 1 hour to effect pyrolysis, thereby obtaining ceramic fiber. This fiber was found to have a tensile strength of 100–250 kgf/mm$^2$ (average:

130 kgf/mm$^2$. Elementary analysis of the ceramic fiber gave the following results (in terms of % by weight):
Si: 48.5, N: 37.1, C: 1.5, O: 5.4, Ti: 11.0

EXAMPLE 7

Production of Polytitanosilazane

To a 500 ml four-necked flask equipped with a gas feed conduit, a dropping funnel, a thermometer and a magnetic stirrer, a dry nitrogen gas was fed for replacing the air therewith. Then, 2.93 g of the polymethyl(-hydro)silazane obtained in Reference Example 2 and 80 ml of dry o-xylene were charged into the flask, into which 3.46 g (11.9 mmol) of titanium isopropoxide were added with stirring and, further, 7.67 g (47.6 mmol) of hexamethyldisilazane (($CH_3$)$_3$SiNHSi($CH_3$)$_3$)) were added into the flask using a syringe. The mixture was reacted at a temperature of 130°–135° C., whereupon the colorless reaction mixture was turned yellow. After completion of the reaction, the solvent was removed in vacuo to obtain light yellow solids with a yield of 80% by weight.

Figure 7:
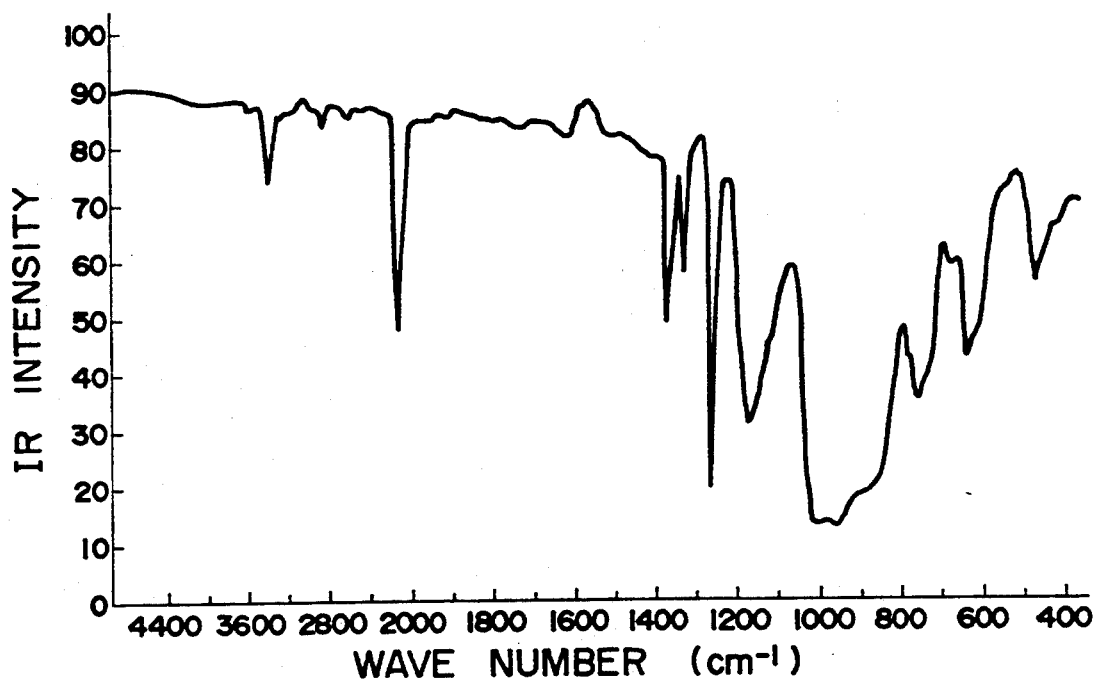
FIG. 7 is the infrared spectrum of the polymer produced in Example 7 below, in accordance with the present invention.

The cryoscopic method using dry benzene as a solvent revealed that the polyborosilazane had a number-average molecular weight of 1,870. The infrared spectrum of this polymer (solvent: dry benzene) is shown in FIG. 7. There are absorption peaks based on ($CH_3$)$_2$CH— (at 1,365 and 1,335 $cm^{-1}$), peaks based on (C-O)Ti (at 995 $cm^{-1}$) and a peak based on Ti-O (615 $cm^{-1}$) in addition to a peak based on NH (3,380 $cm^{-1}$) and a peak based on Si-H (2,120 $cm^{-1}$). No peak based on SiO (1,100 $cm^{-1}$) was observed. The elementary analysis of the polymer gave the following results (in terms of % by weight):
Si: 48.5, N: 25.0, C: 12.2, O: 2.0, H: 6.2, Ti: 6.1

Production of Ceramics

Part of the thus obtained polytitanosilazane was dissolved in toluene and the solution was adjusted to a predetermined concentration. The solution was then poured into a mold cavity of a mold formed of a tetrafluoroethylene. Then the solvent was removed at 200° C. under a nitrogen stream to obtain a transparent shaped mass having a size of 20 mmo×10 mm. This was heated to 1,000° C. in the atmosphere of ammonia at a heating rate of 1° C./min and then to 1,600° C. in a nitrogen atmosphere at a heating rate of 10° C./min, and further maintained at that temperature for 10 hours, thereby obtaining white, disk-like ceramic body. Elementary analysis of the shaped ceramic body gave the following results (in terms of % by weight):
Si: 51.7, N: 36.8, C: 2.0, O: 2.3, Ti: 7.2
Powder X-ray diffraction analysis revealed that the shaped body was amorphous. The shaped body had a three-point bending strength of 5.9 MPa.

Another part of the polytitanosilazane obtained above was processed to obtain ceramic fibers. Thus, the polyborosilazane was dissolved in xylene and the solvent was removed in vacuo. The removal of the solvent was stopped when the solution had desired spinnability. The resultant solution was charged in a defoaming vessel of a dry-spinning device and maintained in quiescent state at 60° C. for about 2 hours to effect defoaming. Then, the solution was injected at 30° C. through a nozzle having a nozzle diameter of 0.1 mm into a cylinder maintained at 130° C. under ambient dry air, and the spun fiber was taken up at a speed of 300 m/min on a bobbin, thereby obtaining a fiber having an average diameter of 12 μm. While applying a tension of 500 g/mm², this fiber was heated from room temperature to 1,000° C. at a heating rate of 1° C./min in an ammoniacal atmosphere and then to 1,600° C. at a heating rate of 10° C./min in a nitrogen atmosphere and maintained at 1,600° C. for 1 hour to effect pyrolysis, thereby obtaining ceramic fiber. This fiber was found to have a tensile strength of 130–280 kgf/mm² (average: 160 kgf/mm². Elementary analysis of the ceramic fiber gave the following results (in terms of % by weight):

Si: 46.5, N: 35.1, C: 3.5, O: 5.0, Ti: 7.0

EXAMPLE 8

Production of polyhydroaluminosilazane

To a 500 ml four-necked flask equipped with a gas feed conduit, a dropping funnel, a thermometer and a magnetic stirrer, a dry nitrogen gas was fed for replacing the air therewith. Then, 1.50 g (7.34 mmol) of aluminum isopropoxide were charged into the flask, into which 83 ml of a solution of the perhydropolysilazane obtained in Reference Example 1 in benzene (concentration of perhydropolysilazane: 40.72 g/l) was added using a syringe with stirring and, further, 3.55 g (22.0 mmol) of hexamethyldisilazane ((CH$_3$)$_3$SiNHSi(CH$_3$)$_3$)) were added into the flask using a syringe. The mixture was then reacted at 80° C. for 2 hours under reflux in the atmosphere of argon so that the colorless reaction mixture was turned light yellow. After completion of the reaction, the solvent was removed in vacuo to obtain polyhydroaluminosilazane with a yield of 92% by weight.

Figure 8:
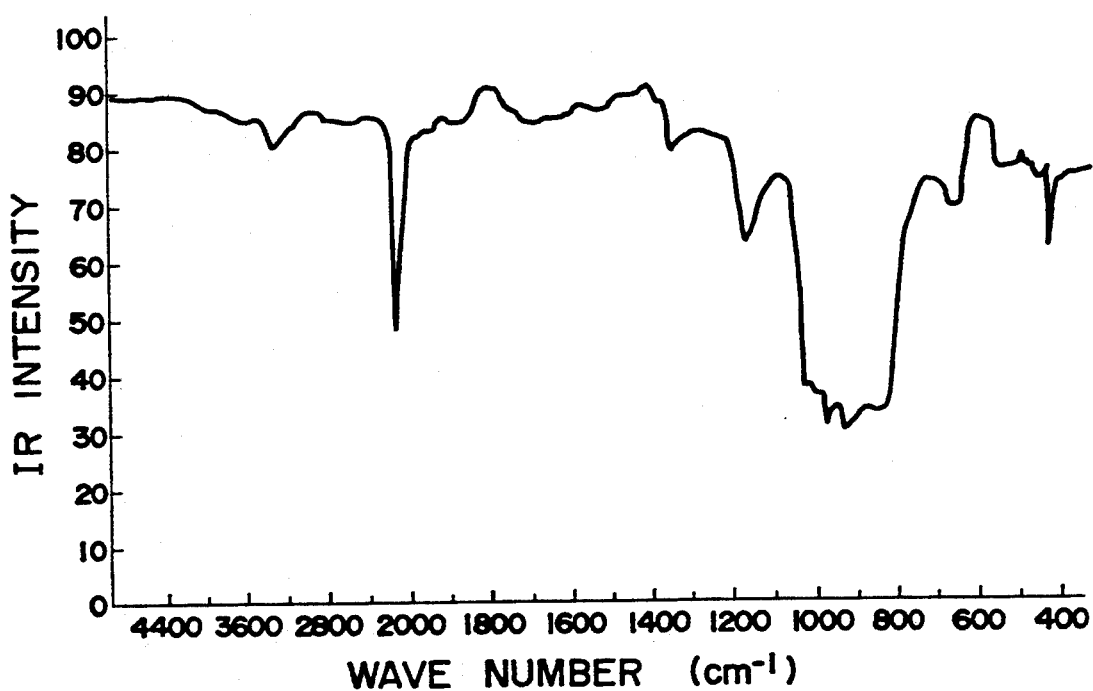
FIG. 8 is the infrared spectrum of the polymer produced in Example 8 below, in accordance with the present invention.

The cryoscopic method using dry benzene as a solvent revealed that the polyhydroaluminosilazane had a number-average molecular weight of 2,150. The infrared spectrum of this polymer (solvent: dry benzene) is shown in FIG. 8. There are absorption peaks based on (C-O)Al (at 1,380 and 1,200 cm$^{-1}$) in addition to a peak based on NH (3,350 cm$^{-1}$) and a peak based on Si-H (2,170 cm$^{-1}$). No peak based on SiO (1,100 cm$^{-1}$) was observed. The elementary analysis of the polymer gave the following results (in terms of % by weight):

Si: 51.1, N: 25.6, C: 8.5, O: 2.9, H: 7.0, Al: 4.9

Production of Ceramics

Part of the thus obtained polyhydroaluminosilazane was dissolved in toluene and the solution was adjusted to a predetermined concentration. The solution was then poured into a mold cavity of a mold formed of a tetrafluoroethylene. Then the solvent was removed at 200° C. under a nitrogen stream to obtain a transparent shaped mass having a size of 20 mmo × 10 mm. This was heated to 1,000° C. in the atmosphere of ammonia at a heating rate of 1° C./min and then to 1,600° C. in a nitrogen atmosphere at a heating rate of 10° C./min, and further maintained at that temperature for 10 hours, thereby obtaining white, disk-like ceramic body. Elementary analysis of the shaped ceramic body gave the following results (in terms of % by weight):

Si: 51.7, N: 38.9, C: 0.9, O: 3.5, Al: 5.0

Powder X-ray diffraction analysis revealed that the shaped body was amorphous. The shaped body had a three-point bending strength of 6.9 MPa.

EXAMPLE 9

Production of Polyaluminosilazane

To a 500 ml four-necked flask equipped with a gas feed conduit, a dropping funnel, a thermometer and a magnetic stirrer, a dry nitrogen gas was fed for replacing the air therewith. Then, 4.5 g (22.0 mmol) of aluminum isopropoxide were charged into the flask, into which 300 ml of a solution of the polymethylhydrosilazane obtained in Reference Example 2 in o-xylene (concentration of polysilazane: 20.4 g/l) was added using a syringe with stirring and, further, 10.6 g (66.0 mmol) of hexamethyldisilazane ((CH$_3$)$_3$SiNHSi(CH$_3$)$_3$)) were added into the flask using a syringe. The mixture was refluxed at a temperature of 130° for 48 hours with stirring in the atmosphere of nitrogen, whereupon the colorless reaction mixture was turned light yellow. After completion of the reaction, the solvent was removed in vacuo to obtain light yellow solids with a yield of 88% by weight.

Figure 9:
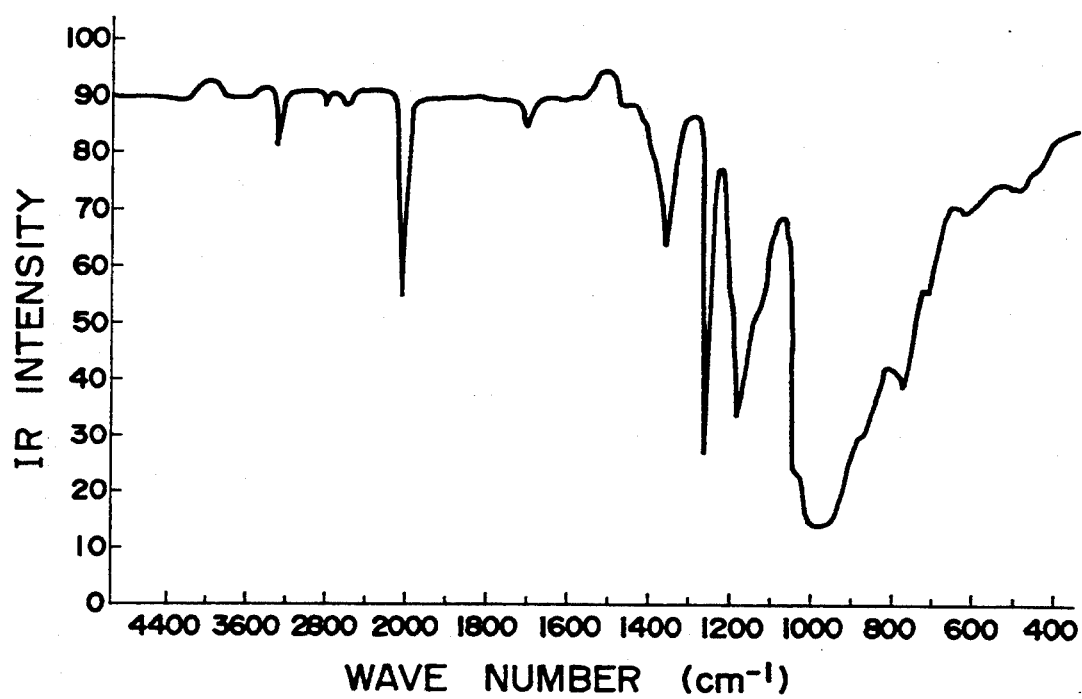
FIG. 9 is the infrared spectrum of the polymer produced in Example 9 below, in accordance with the present invention.

The cryoscopic method using dry benzene as a solvent revealed that the polyaluminosilazane had a number-average molecular weight of 1,920. The infrared spectrum of this polymer (solvent: dry benzene) is shown in FIG. 9. There are absorption peaks based on NH (3,350 cm$^{-1}$) and based on Si-H (2,170 cm$^{-1}$). No peak based on SiO (1,100 cm$^{-1}$) was observed. The elementary analysis of the polymer gave the following results (in terms of % by weight):

Si: 41.7, N: 20.5, C: 24.2, O: 2.8, H: 6.1, Al: 4.7

Production of Ceramics

Part of the thus obtained polyaluminonosilazane was dissolved in toluene and the solution was adjusted to a predetermined concentration. The solution was then poured into a mold cavity of a mold formed of a tetrafluoroethylene, Then the solvent was removed at 200° C. under a nitrogen stream to obtain a transparent shaped mass having a size of 20 mmo × 10 mm. This was heated to 1,000° C. in the atmosphere of ammonia at a heating rate of 1° C./min and then to 1,600° C. in a nitrogen atmosphere at a heating rate of 10° C./min, and further maintained at that temperature for 10 hours, thereby obtaining white, disk-like ceramic body. Elementary analysis of the shaped ceramic body gave the following results (in terms of % by weight):

Si: 45.6, N: 42.2, C: 3.5, O: 2.9, Al: 5.8

Powder X-ray diffraction analysis revealed that the shaped body was amorphous. The shaped body had a three-point bending strength of 3.5 MPa.

EXAMPLE 10

Production of Polyzirconosilazane

To a 200 ml four-necked flask equipped with a gas feed conduit, a dropping funnel, a thermometer and a magnetic stirrer, a dry nitrogen gas was fed for replacing the air therewith. Then, 63.4 g of a solution of the perhydropolysilazane obtained in Reference Example 1 in o-xylene (concentration of perhydropolysilazane: 4.45% by 9 weight) were charged into the flask. A solution of 4.00 g (12.2 mmol) of zirconium isopropoxide dissolved in 6.0 ml dry benzene was added into the solution in the flask using a syringe with stirring and, further, 7.86 g (48.8 mmol) of hexamethyldisilazane ((CH$_3$)$_3$SiNHSi(CH$_3$)$_3$)) were added into the flask using a syringe. The mixture was then reacted at 90° C. in the atmosphere of dry nitrogen so that the colorless reaction mixture was turned light yellow. After completion of the reaction, the solvent was removed in vacuo to obtain polyzirconosilazane.

Figure 10:
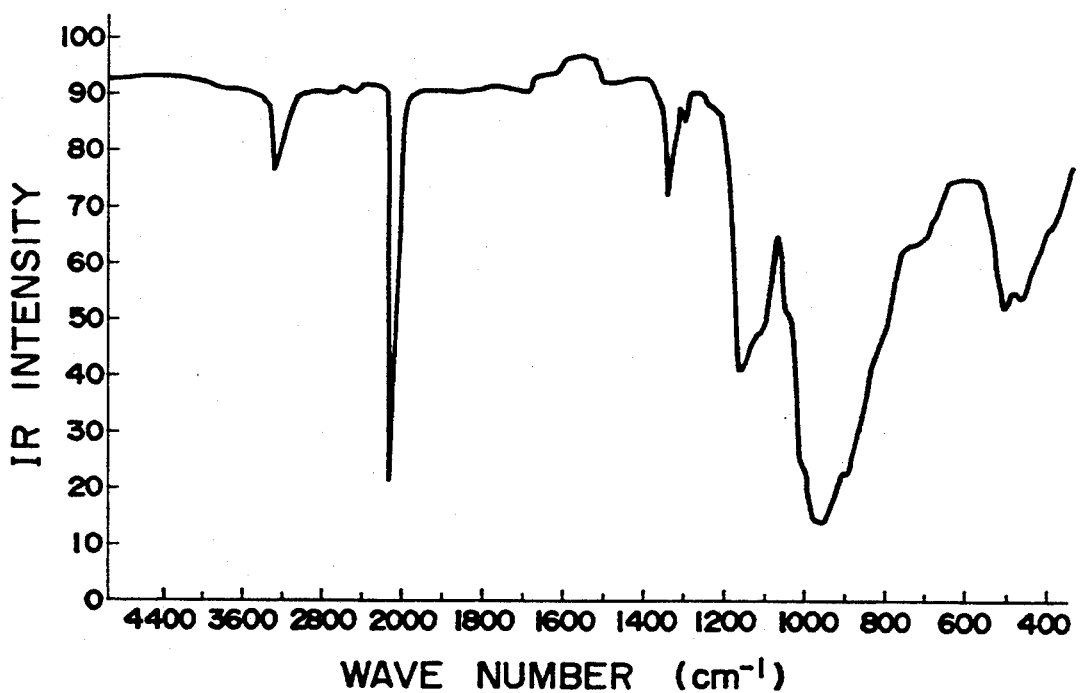
FIG. 10 is the infrared spectrum of the polymer produced in Example 10 below, in accordance with the present invention.

The cryoscopic method using dry benzene as a solvent revealed that the polyzirconosilazane had a number-average molecular weight of 2,440. The infrared spectrum of this polymer (solvent: dry benzene) is shown in FIG. 10. There are absorption peaks based on (CH$_3$)$_2$CH— (at 1,365 and 1,335 cm$^{-1}$), peaks based on (C-O)Zr (at 1,170 cm$^{-1}$) and peaks based on Si-0-Zr and (C-O)Zr (950 cm$^{-1}$) in addition to a peak based on NH (3,350 cm$^{-1}$) and a peak based on Si-H (2,170 cm$^{-1}$). The elementary analysis of the polymer gave the following results (in terms of % by weight):

Si: 40.8, N: 21.5, C: 8.5, O: 3.3, H: 6.8, Zr: 19.1

Production of Ceramics

Part of the thus obtained polyzirconosilazane was dissolved in toluene and the solution was adjusted to a predetermined concentration. The solution was then poured into a mold cavity of a mold formed of a tetrafluoroethylene. Then the solvent was removed at 200° C. under a nitrogen stream to obtain a transparent shaped mass having a size of 20 mmo× 10 mm. This was heated to 1,000° C. in the atmosphere of ammonia at a heating rate of 1° C./min and then to 1,600° C. in a nitrogen atmosphere at a heating rate of 10° C./min, and further maintained at that temperature for 10 hours, thereby obtaining white, disk-like ceramic body. Elementary analysis of the shaped ceramic body gave the following results (in terms of % by weight):

Si: 45.0, N: 28.5, C: 0.5, O: 3.5, Zr: 22.5

Powder X-ray diffraction analysis revealed that the shaped body was amorphous. The shaped body had a three-point bending strength of 6.6 MPa.

EXAMPLE 11

Production of Polyzirconosilazane

To a 500 ml four-necked flask equipped with a gas feed conduit, a dropping funnel, a thermometer and a magnetic stirrer, a dry nitrogen gas was fed for replacing the air therewith. Then, 7.33 g of the polymethyl(-hydro)silazane obtained in Reference Example 2 and 250 ml of dry o-xylene were charged into the flask, into which 11.4 g (34.7 mmol) of zirconium isopropoxide were added with stirring and, further, 22.3 g (138.8 mmol) of hexamethyldisilazane ((CH$_3$)$_3$SiNHSi(CH$_3$)$_3$)) were added into the flask using a syringe. The mixture was then reacted at 130°-135° C. After completion of the reaction, the solvent was removed in vacuo to obtain polyzirconosilazane.

The cryoscopic method using dry benzene as a solvent revealed that the polyzirconosilazane had a number-average molecular weight of 2,000. The infrared spectrum of this polymer (solvent: dry benzene) is shown in FIG. 11. There are absorption peaks based on (CH$_3$)$_2$CH— (at 1,360 and 1,340 cm$^{-1}$) and peaks based on (C-O)Zr (at 1,170 and 1,000 cm$^{-1}$) in addition to a peak based on NH (3,380 cm$^{-1}$) and a peak based on Si-H (2,120 cm$^{-1}$). The elementary analysis of the polymer gave the following results (in terms of % by weight):

Si: 33.0, N: 18.1, C: 25.5, O: 2.1, H: 6.1, Zr: 15.2

Production of Ceramics

Part of the thus obtained polyzirconosilazane was dissolved in toluene and the solution was adjusted to a predetermined concentration. The solution was then poured into a mold cavity of a mold formed of a tetrafluoroethylene. Then the solvent was removed at 200° C. under a nitrogen stream to obtain a transparent shaped mass having a size of 20 mmo× 10 mm. This was heated to 1,000° C. in the atmosphere of ammonia at a heating rate of 1° C./min and then to 1,600° C. in an nitrogen atmosphere at a heating rate of 10° C./min, and further maintained at that temperature for 10 hours, thereby obtaining white, disk-like ceramic body. Elementary analysis of the shaped ceramic body gave the following results (in terms of % by weight):

Si: 47.4, N: 29.2, C: 6.2, O: 2.3, Zr: 14.9

Powder X-ray diffraction analysis revealed that the shaped body was amorphous. The shaped body had a three-point bending strength of 10.2 MPa.

What is claimed is:

1. A process of producing a polymetalosilazane, comprising reacting a polysilazane with a metal alkoxide of the formula:

$$M(OR^3)_n$$

wherein M is a metal selected from the group consisting of the metals of groups IIa, IIIa, IIIb, IVa, IVb, Va and Vb of the Periodic Table. R$^3$ is hydrogen, an alkyl group having 1-20 carbon atoms or an aryl group and n is the valence of the metal M with the proviso that at least one of the n number of the R$^3$ is the alkyl group or aryl group, in the presence of a silicon compound represented by the following general formula:

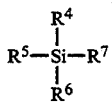

$$R^5-\underset{\underset{R^6}{|}}{\overset{\overset{R^4}{|}}{Si}}-R^7$$

wherein R$^4$, R$^5$, R$^6$ and R$^7$, independently from each other, represent hydrogen, a hydrocarbyl group, a substituted hydrocarbyl group, an alkylsilyl group, an alkylamino group, an alkoxy group, —SR$^8$ where R$^8$ represents hydrogen or an alkyl group or —SR$^9$R$^{10}$R$^{11}$ where R$^9$ R$^{10}$ and R$^{11}$, independently from each other, represent hydrogen or an alkyl group.

2. A process as set forth in claim 1, wherein said polysilazane has a number average molecular weight of 100–500,000 and having a main skeletal structure containing the following recurring unit:

$$-\underset{\underset{R^2}{|}}{\overset{\overset{R^1}{|}}{Si}}-\underset{H}{\overset{}{N}}-$$

wherein R$^1$ and R$^2$, independently from each other, represent hydrogen, a hydrocarbyl group, a substituted hydrocarbyl group, an alkylsilyl group, an alkylamino group or an alkoxy group.

3. A process as set forth in claim 1, wherein said metal is selected from the group consisting of Be, Mg, Ca, Sr, Ba, Sc, Y, lanthanoid elements, actinoid elements, B, Al, Ga, In, Tl, Ti, Zr, Hf, Ge, Sn, Pb, V, Nb, Ta, As, Sb, and Bi.

4. A process as set forth in claim 1, wherein said R$^4$, R$^5$, R$^6$ and R$^7$ are each a hydrocarbyl moiety selected from the group consisting of alkyl, alkenyl, aryl, cycloalkyl and aralkyl.

5. A polymetalosilazane obtained by the process according to claim 1.

6. A polymetalosilazane as set forth in claim 5 and being substantially free of —Si—O— linkages.

* * * * *

UNITED STATES PATENT AND TRADEMARK OFFICE
CERTIFICATE OF CORRECTION

PATENT NO. : 5,436,398          PAGE 1 OF 2
DATED      : July 25, 1995
INVENTOR(S): SHIMIZU et al It is certified that error appears in the above-indentified patent and that said Letters Patent is hereby corrected as shown below:

Col. 1, line 9, delete "same.:" and insert --same.--.

Col. 5, line 67, delete "4".

Col. 9, line 52, delete "liltrate" and insert --filtrate--.

Col. 10, line 28, delete "8"; and line 29, delete "9".

Col. 14, line 46, delete "Si-o" and insert --Si-O--; and line 60, delete "mmo" and insert --mmø--.

Col. 16, line 1, delete "mmo" and insert --mmø--; and line 56, delete "mmo" and insert --mmø--.

Col. 17, line 42, delete "mmo" and insert --mmø--.

Col. 18, line 25, delete "mmo" and insert --mmø--.

Col. 19, line 36, delete "mmo" and insert --mmø--.

Col. 20, line 44, delete "mmo" and insert --mmø--.

Col. 21, line 51, delete "mmo" and insert --mmø--.

Col. 22, line 34, delete "mmo" and insert --mmø--; and line 56, delete "9".

UNITED STATES PATENT AND TRADEMARK OFFICE
CERTIFICATE OF CORRECTION

PATENT NO. : 5,436,398
DATED : July 25, 1995
INVENTOR(S) : SHIMIZU et al

It is certified that error appears in the above-indentified patent and that said Letters Patent is hereby corrected as shown below:

Col. 23, line 19, delete "mmo" and insert --mmø--; and line 67, delete "mmo" and insert --mmø--.

Col. 24, line 20, delete "Table." insert --Table,--.

Signed and Sealed this

Sixteenth Day of April, 1996

BRUCE LEHMAN

Attest:

Attesting Officer

Commissioner of Patents and Trademarks